United States Patent
Fang et al.

(10) Patent No.: US 11,800,095 B2
(45) Date of Patent: Oct. 24, 2023

(54) VIDEO PICTURE ENCODING AND DECODING METHOD AND DEVICE

(71) Applicant: Huawei Technologies Co., Ltd., Shenzhen (CN)

(72) Inventors: Huameng Fang, Shenzhen (CN); Peiyun Di, Shenzhen (CN); Fuzheng Yang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 16/918,301

(22) Filed: Jul. 1, 2020

(65) Prior Publication Data

US 2020/0336740 A1    Oct. 22, 2020

Related U.S. Application Data

(63) Continuation of application No. PCT/CN2018/115049, filed on Nov. 12, 2018.

(30) Foreign Application Priority Data

Jan. 3, 2018    (CN) .................. 201810006308.5

(51) Int. Cl.
  *H04N 19/117*   (2014.01)
  *H04N 19/174*   (2014.01)
  *H04N 19/70*    (2014.01)

(52) U.S. Cl.
  CPC ......... *H04N 19/117* (2014.11); *H04N 19/174* (2014.11); *H04N 19/70* (2014.11)

(58) Field of Classification Search
  None
  See application file for complete search history.

(56) References Cited

U.S. PATENT DOCUMENTS

2006/0239571 A1    10/2006  Dong et al.
2013/0107973 A1*    5/2013  Wang ............... H04N 19/82
                                                       375/E7.193

(Continued)

FOREIGN PATENT DOCUMENTS

CN    101472175 A    7/2009
CN    105678721 A    6/2016

(Continued)

OTHER PUBLICATIONS

Wollborn, M., et al., "Remarks on In-Loop Deblocking in H.26L," (Video Coding Experts Group of ITU-T SG.16), No. VCEG-M64, Mar. 2001, XP030003234, 6 pages.

(Continued)

*Primary Examiner* — Xiaolan Xu
(74) *Attorney, Agent, or Firm* — Conley Rose, P.C.

(57) ABSTRACT

A video picture encoding and decoding method, including obtaining a primary sub-region bitstream corresponding to a target sub-picture of a panoramic picture, where the primary sub-region bitstream includes N secondary sub-region bitstreams, and N is a positive integer, parsing the primary sub-region bitstream to obtain a reconstructed picture, performing cross-sub-region-boundary out-loop filtering on the reconstructed picture when an out-loop filtering identifier instructs to perform cross-sub-region-boundary out-loop filtering on the reconstructed picture, to obtain a filtered reconstructed picture, and adjusting a location of at least one of N sub-regions in the filtered reconstructed picture to obtain a picture having no sub-region boundary.

20 Claims, 7 Drawing Sheets

(56) References Cited

U.S. PATENT DOCUMENTS

| | | | |
|---|---|---|---|
| 2016/0361658 A1 | 12/2016 | Osman et al. | |
| 2017/0118540 A1 | 4/2017 | Thomas et al. | |
| 2017/0237965 A1 | 8/2017 | Wang et al. | |
| 2017/0332107 A1 | 11/2017 | Abbas et al. | |
| 2018/0063505 A1* | 3/2018 | Lee | H04N 21/23614 |
| 2018/0367586 A1* | 12/2018 | Maze | H04N 21/6437 |

FOREIGN PATENT DOCUMENTS

| | | |
|---|---|---|
| CN | 106060652 A | 10/2016 |
| CN | 106454364 A | 2/2017 |
| CN | 107395984 A | 11/2017 |
| EP | 2769545 B1 | 4/2018 |
| WO | 2016191702 A1 | 12/2016 |

OTHER PUBLICATIONS

Hannuksela, M., et al., "Virtual reality video metadata for Dash MPD," (Motion Picture Expert Group or 1SO/IEC JTC1/SC29/WG11 ), No. m38944, Oct. 12, 2016, XP030067292, 7 pages.

Tsai, C-Y., et al., "Slice Boundary Processing and Picture Layer Raw Byte Sequence Payload," (Joint Collaborative Team on Video Coding of 1SO/IEC JTC1/SC29/WG11 and ITU-T SG.16 ), No. JCTVC-D128, Jan. 2011, XP030226817, 20 pages.

Sanchez, Y., et al., "Compressed Domain Video Processing for Tile Based Panoramic Streaming using HEVC," 2015 IEEE International Conference on Image Processing (ICIP), 2015, pp. 2244-2248.

ISO/IEC 23008-2:2013, "Information technology—High efficiency coding and media delivery in heterogeneous environments Part 2: High efficiency video coding", Dec. 2013, 13 pages.

ITU-T H.265, "Series H: Audiovisual and Multimedia Systems Infrastructure of audiovisual services Coding of moving video High efficiency video coding," Dec. 2016, 664 pages.

ISO/IEC 14496-12, Fifth edition, "Information technology—Coding of audiovisual objects—Part 12: ISO base media file format," Dec. 15, 2015, 248 pages.

* cited by examiner

Server       Terminal device

| a00 | a01 | a02 | a03 | a04 | a05 |
|-----|-----|-----|-----|-----|-----|
| a10 | a11 | a12 | a13 | a14 | a15 |
| a20 | a21 | a22 | a23 | a24 | a25 |
| a30 | a31 | a32 | a33 | a34 | a35 |
| a40 | a41 | a42 | a43 | a44 | a45 |
| a50 | a51 | a52 | a53 | a54 | a55 |

| a00 | a01 | a02 | a03 | a04 | a05 |
|-----|-----|-----|-----|-----|-----|
| a10 | a11 | a12 | a13 | a14 | a15 |
| a20 | a21 | a22 | a23 | a24 | a25 |
| a30 | a31 | a32 | a33 | a34 | a35 |
| a40 | a41 | a42 | a43 | a44 | a45 |
| a50 | a51 | a52 | a53 | a54 | a55 |

| a00 | a01 | a02 | a03 | a04 |
|-----|-----|-----|-----|-----|
| a22 | a11 | a12 | a13 | a05 |

VIDEO PICTURE ENCODING AND DECODING METHOD AND DEVICE

CROSS-REFERENCE TO RELATED APPLICATIONS

This application is a continuation of International Patent Application No. PCT/CN2018/115049 filed on Nov. 12, 2018, which claims priority to Chinese Patent Application No. 201810006308.5 filed on Jan. 3, 2018. The disclosures of the aforementioned applications are hereby incorporated by reference in their entireties.

TECHNICAL FIELD

The present disclosure relates to the picture processing field, and in particular, to a video picture encoding and decoding method and device.

BACKGROUND

Virtual reality (VR)/360 degree(°) panoramic videos bring people new ways of viewing and new visual experience. In a VR video application scenario, all content viewed by a user at a moment is referred to as a "visual angle". A picture signal of a VR panoramic video may be virtualized into a spherical signal.

Because picture content information viewed by a user at each moment (each moment corresponds to one visual angle) occupies only a small portion of an entire panoramic picture, an entire video picture may be divided, and a bitstream corresponding to a sub-region that corresponds to a current visual angle may be transmitted to present the visual angle, without a need of transmitting the entire picture.

To save encoding bandwidth and reduce a requirement for a decoding capability of a terminal, currently, a visual angle-based VR encoding and transmission solution is widely accepted in the industry and is gradually to be used. The visual angle-based VR encoding and transmission solution is implemented in the following steps. On a server, a VR panoramic video picture is divided into a plurality of sub-regions, where each sub-region corresponds to one sub-bitstream, a client requests, based on location information of a visual angle of a user at a current moment, one or more secondary sub-region bitstreams corresponding to a current visual angle, on the server or the client, these bitstreams are assembled to generate a new standard High Efficiency Video Coding (HEVC) bitstream, where the bitstream includes video content of these sub-region bitstreams, and after the new standard HEVC bitstream is decoded on the client, each sub-region picture is arranged based on its location in an original VR panoramic video to constitute a picture of a visual angle, and the picture is sent to a terminal for presentation.

Different visual angles are composed of content of different sub-regions, and content of a same sub-region may belong to a same visual angle. Therefore, each secondary sub-region bitstream needs to support separate decoding, that is, no mutual reference is applied between sub-regions during encoding. Because encoding processes of content of sub-regions are independent of each other, quantization error distribution characteristics are independent of each other. As a result, an obvious boundary appears between original adjacent locations, and a "misconception" of content discontinuity is produced subjectively, affecting subjective experience. Therefore, smoothing processing needs to be performed on this boundary.

A block-based encoding policy is used in standard HEVC video encoding. Because quantization errors of sub-blocks in different encoding processes are independent of each other, discontinuity of a reconstructed picture is shown at an edge of a block, thereby easily resulting in a "blocking artifact". To eliminate the blocking artifact, an HEVC standard stipulates a flexible and effective in-loop blocking filtering method. The filtering method can effectively eliminate a blocking artifact between code blocks, and is also used for smoothing filtering on a boundary between sub-regions (Tile or Slice) in a standard HEVC bitstream.

To resolve a problem of discontinuity at a boundary, a block-based encoding policy based on standard HEVC video encoding is used in other approaches. A filtering strength is determined based on encoding parameter information (including a prediction mode, a quantization step length, and the like) of code blocks on both sides of the boundary and pixel gradient information on both sides. This can effectively avoid a real boundary and perform smoothing filtering only on a boundary introduced by encoding, thereby achieving a relatively good boundary filtering effect. In this method, all content of a picture is considered as continuous by default. Therefore, weighted filtering processing is directly performed on pixels on both sides of the boundary. However, in the visual angle-based VR encoding and transmission solution, a decoded reconstructed picture obtained by assembling sub-bitstreams obtained for each visual angle needs to be a complete rectangle. Therefore, when the sub-bitstreams are assembled into a new bitstream, relative locations of original adjacent sub-regions with continuous content need to be re-arranged. After the re-arrangement, content of adjacent sub-regions may be discontinuous. If the foregoing method is directly used, an artifact phenomenon occurs in regions on both sides of the boundary. In another aspect, after performing filtering on the reconstructed picture, the standard decoder stores the filtered reconstructed picture to a decoding frame buffer for participating in subsequent decoding. However, in the visual angle-based VR encoding solution, a decoder is required to be able to separately decode sub-region bitstreams, and cross-sub-region in-loop filtering needs to be disabled during decoding. Therefore, if cross-sub-region in-loop filtering is enabled on the decoder, encoding and decoding mismatch is caused.

Another approach specifies whether to filter, during decoding, on sub-region boundaries in a reconstructed picture that are on a same straight line. In a visual angle-based VR encoding and transmission system, sub-region bitstreams corresponding to each visual angle are assembled based on an unordered state. Therefore, it cannot be indiscriminately specified whether to perform in-loop filtering on all sub-region boundaries on a same straight line. Even if it is specified that boundary filtering is required for a sub-region, in-loop filtering cannot be directly performed because content of the sub-region and its adjacent sub-region is discontinuous.

SUMMARY

Embodiments of the present disclosure provide a video picture encoding and decoding method and device, to resolve a problem of content discontinuity resulting from region-based content encoding of a video picture with continuous content.

According to a first aspect, an embodiment of the present disclosure provides a video picture encoding and decoding method, including obtaining a primary sub-region bitstream corresponding to a target sub-picture of a panoramic picture, where the primary sub-region bitstream includes N secondary sub-region bitstreams, and N is a positive integer, parsing the primary sub-region bitstream to obtain a reconstructed picture, where the reconstructed picture includes N sub-regions, and the N sub-regions one-to-one correspond to the N secondary sub-region bitstreams, performing cross-sub-region-boundary out-loop filtering on the reconstructed picture when an out-loop filtering identifier instructs to perform cross-sub-region-boundary out-loop filtering on the reconstructed picture, to obtain a filtered reconstructed picture, and adjusting a location of at least one of the N sub-regions in the filtered reconstructed picture to obtain the target sub-picture.

In a feasible embodiment, the obtaining a primary sub-region bitstream of a panoramic picture includes obtaining the N secondary sub-region bitstreams, and assembling the N secondary sub-region bitstreams into the primary sub-region bitstream, where each of the N secondary sub-region bitstreams includes second supplementary enhancement information (SEI), second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a picture parameter set (PPS), a sequence parameter set (SPS), a video parameter set (VPS), or first SEI of the primary sub-region bitstream includes the out-loop filtering identifier.

When out-loop filtering is subsequently performed on the reconstructed picture, an adjacent sub-region of each sub-region in the reconstructed picture may be determined using the sub-region information such that filtering can be accurately performed on a sub-region boundary.

In a feasible embodiment, the obtaining a primary sub-region bitstream of a panoramic picture includes obtaining the N secondary sub-region bitstreams, and assembling the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

When out-loop filtering is subsequently performed on the reconstructed picture, an adjacent sub-region of each sub-region in the reconstructed picture may be determined using the sub-region information such that filtering can be accurately performed on a sub-region boundary.

In a feasible embodiment, the first SEI includes the sub-region information.

In a feasible embodiment, a media presentation description (MPD) file includes the sub-region information and the out-loop filtering identifier, and before the performing, based on sub-region information, cross-sub-region-boundary out-loop filtering on the reconstructed picture when an out-loop filtering identifier instructs to perform cross-sub-region-boundary out-loop filtering on the reconstructed picture, to obtain a filtered reconstructed picture, the method further includes obtaining the MPD file, and the performing cross-sub-region-boundary out-loop filtering on the reconstructed picture includes obtaining the sub-region information from the MPD file, and performing cross-sub-region-boundary out-loop filtering on the reconstructed picture based on the sub-region information.

In a feasible embodiment, the out-loop filtering identifier, the sub-region information, and a track of the primary sub-region bitstream are encapsulated in a same box.

In a feasible embodiment, the obtaining the N secondary sub-region bitstreams includes sending a bitstream obtaining request to a server, where the bitstream obtaining request includes information about a visual angle of a user, and receiving a response message sent by the server to respond to the bitstream obtaining request, where the response message includes the N secondary sub-region bitstreams, and the N secondary sub-region bitstreams correspond to the information about a visual angle of a user.

In a feasible embodiment, the obtaining the N secondary sub-region bitstreams includes obtaining, from a server, a secondary sub-region bitstream corresponding to the panoramic picture, and obtaining, from the secondary sub-region bitstream corresponding to the panoramic picture, N secondary sub-region bitstreams corresponding to information about a visual angle of a user.

The secondary sub-region bitstream corresponding to the panoramic picture is downloaded to a terminal device, thereby reducing interaction between the terminal device and the server.

In a feasible embodiment, the obtaining a primary sub-region bitstream includes sending a bitstream obtaining request to a server, where the bitstream obtaining request includes the information about a visual angle of a user, and receiving a response message sent by the server to respond to the bitstream obtaining request, where the response message includes the primary sub-region bitstream, and the N secondary sub-region bitstreams included in the primary sub-region bitstream correspond to the information about a visual angle of a user.

The N secondary sub-region bitstreams are assembled into the primary sub-region bitstream on the server, thereby reducing workload of a terminal device and improving decoding efficiency of the terminal device.

In a feasible embodiment, the performing cross-sub-region-boundary out-loop filtering on the reconstructed picture when an out-loop filtering identifier instructs to perform cross-sub-region-boundary out-loop filtering on the reconstructed picture, to obtain a filtered reconstructed picture includes determining, based on the sub-region information, a sub-region adjacent to any sub-region j of the N sub-regions, determining a target sub-region based on the sub-region adjacent to the sub-region j, where the target sub-region is an overlapping sub-region of the sub-region adjacent to the sub-region j and the N sub-regions, and performing smoothing filtering on a boundary of the sub-region j and a boundary of the target sub-region.

Filtering is performed on the reconstructed picture based on the sub-region information, thereby resolving a problem of content discontinuity of sub-regions in the reconstructed picture.

In a feasible embodiment, the performing cross-sub-region-boundary out-loop filtering on the reconstructed picture when an out-loop filtering identifier instructs to perform cross-sub-region-boundary out-loop filtering on the reconstructed picture, to obtain a filtered reconstructed picture includes determining, based on the sub-region information, a sub-region adjacent to any sub-region j of the N sub-regions, obtaining a target sub-region from the sub-region adjacent to the sub-region j, where the target sub-region is an overlapping sub-region of the sub-region adjacent to the sub-region j and the N sub-regions, and performing smoothing filtering on a boundary of the sub-region j and a boundary of the target sub-region.

Filtering is performed on the reconstructed picture based on the sub-region information, thereby resolving a problem of content discontinuity of sub-regions in the reconstructed picture.

According to a second aspect, an embodiment of the present disclosure provides another video picture encoding and decoding method, including receiving a bitstream obtaining request sent by a terminal device, where the bitstream obtaining request includes information about a visual angle of a user, and sending a response message to the terminal device, where the response message is used to respond to the bitstream obtaining request, the response message includes N secondary sub-region bitstreams or a primary sub-region bitstream, and the N secondary sub-region bitstreams are used to be assembled into the primary sub-region bitstream.

In a feasible embodiment, the response message includes the N secondary sub-region bitstreams, and after the receiving a bitstream obtaining request sent by a terminal device, the method further includes obtaining, from a secondary sub-region bitstream corresponding to a panoramic picture, N secondary sub-region bitstreams corresponding to the information about a visual angle of a user.

In a feasible embodiment, the response message includes the primary sub-region bitstream, the primary sub-region bitstream includes N secondary sub-region bitstreams, and after the receiving a bitstream obtaining request sent by a terminal device, the method further includes obtaining, from a secondary sub-region bitstream corresponding to a panoramic picture, N secondary sub-region bitstreams corresponding to the information about a visual angle of a user, and assembling the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

In a feasible embodiment, the response message includes the primary sub-region bitstream, the primary sub-region bitstream includes N secondary sub-region bitstreams, and after the receiving a bitstream obtaining request sent by a terminal device, the method further includes obtaining, from a secondary sub-region bitstream corresponding to a panoramic picture, N secondary sub-region bitstreams corresponding to the information about a visual angle of a user, and assembling the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

In a feasible embodiment, the first SEI includes the sub-region information.

In a feasible embodiment, the sub-region information, the out-loop filtering identifier, and a track of the primary sub-region bitstream are encapsulated in a same box, or the sub-region information and the out-loop filtering identifier are encapsulated in a media presentation description MPD file.

According to a third aspect, an embodiment of the present disclosure provides a terminal device, including an obtaining unit configured to obtain a primary sub-region bitstream corresponding to a target sub-picture of a panoramic picture, where the primary sub-region bitstream includes N secondary sub-region bitstreams, and N is a positive integer, a parsing unit configured to parse the primary sub-region bitstream to obtain a reconstructed picture, where the reconstructed picture includes N sub-regions, and the N sub-regions one-to-one correspond to the N secondary sub-region bitstreams, a filtering unit configured to perform cross-sub-region-boundary out-loop filtering on the reconstructed picture when an out-loop filtering identifier instructs to perform cross-sub-region-boundary out-loop filtering on the reconstructed picture, to obtain a filtered reconstructed picture, and an adjustment unit configured to adjust a location of at least one of the N sub-regions in the filtered reconstructed picture to obtain the target sub-picture.

In a feasible embodiment, the obtaining unit includes a first obtaining sub-unit configured to obtain the N secondary sub-region bitstreams, and a first assembly sub-unit configured to assemble the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a number of a sub-region corresponding to the secondary sub-region bitstream i and a number of a sub-region bitstream adjacent to the sub-region corresponding to the secondary sub-region bitstream i, each secondary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

In a feasible embodiment, the obtaining unit includes the first obtaining sub-unit configured to obtain the N secondary sub-region bitstreams, and a second assembly sub-unit configured to assemble the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes the sub-region information, the sub-region information is used to indicate information about coordinates, in the panoramic picture, of each of the N sub-regions, and a PPS, an SPS, a VPS, or first SEI of the primary sub-region bitstream includes the out-loop filtering identifier.

In a feasible embodiment, the first SEI includes the sub-region information.

In a feasible embodiment, the media presentation description MPD file includes the sub-region information and the out-loop filtering identifier, and the obtaining unit is further configured to obtain the MPD file, and the filtering unit is further configured to obtain the sub-region information from the MPD file, and perform cross-sub-region-boundary out-loop filtering on the reconstructed picture based on the sub-region information.

In a feasible embodiment, the out-loop filtering identifier, the sub-region information, and a track of the primary sub-region bitstream are encapsulated in a same box.

In a feasible embodiment, the first obtaining sub-unit includes a first sending sub-unit configured to send a bitstream obtaining request to a server, where the bitstream obtaining request includes the information about a visual angle of a user, and a first receiving sub-unit configured to receive a response message sent by the server to respond to the bitstream obtaining request, where the response message includes the N secondary sub-region bitstreams, and the N secondary sub-region bitstreams correspond to the information about a visual angle of a user.

In a feasible embodiment, the first obtaining sub-unit includes a second obtaining sub-unit configured to obtain, from a server, a secondary sub-region bitstream corresponding to the panoramic picture, and a third obtaining sub-unit configured to obtain, from the secondary sub-region bitstream corresponding to the panoramic picture, N secondary sub-region bitstreams corresponding to the information about a visual angle of a user.

In a feasible embodiment, the obtaining unit includes a second sending sub-unit configured to send a bitstream obtaining request to a server, where the bitstream obtaining request includes information about a visual angle of a user, and a second receiving sub-unit configured to receive a response message sent by the server to respond to the bitstream obtaining request, where the response message includes the primary sub-region bitstream, and the N secondary sub-region bitstreams included in the primary sub-region bitstream correspond to the information about a visual angle of a user.

In a feasible embodiment, the filtering unit is configured to determine, based on the sub-region information, a sub-region adjacent to any sub-region j of the N sub-regions, determine a target sub-region based on the sub-region adjacent to the sub-region j, where the target sub-region is an overlapping sub-region of the sub-region adjacent to the sub-region j and the N sub-regions, and perform smoothing filtering on a boundary of the sub-region j and a boundary of the target sub-region.

In a feasible embodiment, the filtering unit is configured to determine, based on the sub-region information, a sub-region adjacent to any sub-region j of the N sub-regions, obtain a target sub-region from the sub-region adjacent to the sub-region j, where the target sub-region is an overlapping sub-region of the sub-region adjacent to the sub-region j and the N sub-regions, and perform smoothing filtering on a boundary of the sub-region j and a boundary of the target sub-region.

According to a fourth aspect, an embodiment of the present disclosure provides a server, including a receiving unit configured to receive a bitstream obtaining request sent by a terminal device, where the bitstream obtaining request includes information about a visual angle of a user, and a sending unit configured to send a response message to the terminal device, where the response message is used to respond to the bitstream obtaining request, the response message includes N secondary sub-region bitstreams or a primary sub-region bitstream, and the N secondary sub-region bitstreams are used to be assembled into the primary sub-region bitstream.

In a feasible embodiment, the response message includes the N secondary sub-region bitstreams, and the server further includes a first obtaining unit configured to, after the receiving unit receives the bitstream obtaining request sent by the terminal device, obtain, from a secondary sub-region bitstream corresponding to a panoramic picture, N secondary sub-region bitstreams corresponding to the information about a visual angle of a user.

In a feasible embodiment, the response message includes the primary sub-region bitstream, the primary sub-region bitstream includes N secondary sub-region bitstreams, and the server further includes a second obtaining unit configured to, after the receiving unit receives the bitstream obtaining request sent by the terminal device, obtain, from a secondary sub-region bitstream corresponding to a panoramic picture, N secondary sub-region bitstreams corresponding to the information about a visual angle of a user, and a first assembly unit configured to assemble the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

In a feasible embodiment, the response message includes the primary sub-region bitstream, the primary sub-region bitstream includes N secondary sub-region bitstreams, and the server further includes a third obtaining unit configured to, after the receiving unit receives the bitstream obtaining request sent by the terminal device, obtain, from M secondary sub-region bitstreams corresponding to a panoramic picture, N secondary sub-region bitstreams corresponding to the information about a visual angle of a user, and a second assembly unit configured to assemble the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

In a feasible embodiment, the first SEI includes the sub-region information.

In a feasible embodiment, the out-loop filtering identifier, the sub-region information, and a track of the primary sub-region bitstream are encapsulated in a same box, or the out-loop filtering identifier and the sub-region information are encapsulated in a media presentation description MPD file.

According to a fifth aspect, an embodiment of the present disclosure provides a terminal device, including a memory that stores executable program code, and a processor coupled to the memory, where the processor invokes the executable program code stored in the memory to perform all or some of the methods in the first aspect.

According to a sixth aspect, an embodiment of the present disclosure provides a computer readable storage medium.

The computer storage medium stores a computer program. The computer program includes a program instruction. When the program instruction is executed by a processor, the processor is enabled to perform all or some of the methods in the first aspect.

According to a seventh aspect, an embodiment of the present disclosure provides another server, including a memory that stores executable program code, and a processor coupled to the memory, where the processor invokes the executable program code stored in the memory to perform all or some of the methods in the second aspect.

According to an eighth aspect, an embodiment of the present disclosure provides another computer readable storage medium. The computer storage medium stores a computer program. The computer program includes a program instruction. When the program instruction is executed by a processor, the processor is enabled to perform all or some of the methods in the second aspect.

It can be learned that in the solutions in the embodiments of the present disclosure, the terminal device obtains the primary sub-region bitstream corresponding to the target sub-picture of the panoramic picture, where the primary sub-region bitstream includes the N secondary sub-region bitstreams, and N is a positive integer, parses the primary sub-region bitstream to obtain the reconstructed picture, where the reconstructed picture includes the N sub-regions, and the N sub-regions one-to-one correspond to the N secondary sub-region bitstreams, performs cross-sub-region-boundary out-loop filtering on the reconstructed picture when the out-loop filtering identifier instructs to perform cross-sub-region-boundary out-loop filtering on the reconstructed picture, to obtain the filtered reconstructed picture, and adjusts the location of the at least one of the N sub-regions in the filtered reconstructed picture to obtain the target sub-picture. The solutions in the embodiments of the present disclosure help resolve a problem of content discontinuity resulting from region-based encoding of a video picture with continuous content, thereby improving picture quality. In addition, after the out-loop filtering identifier is added to the primary sub-region bitstream, a standard decoder can not only support conventional in-loop filtering, but also support out-loop filtering, thereby improving adaptability of an encoder.

These aspects or other aspects of the present disclosure are clearer and easier to understand in descriptions of the following embodiments.

BRIEF DESCRIPTION OF DRAWINGS

To describe the technical solutions in the embodiments of the present disclosure or in other approaches more clearly, the following briefly describes the accompanying drawings required for describing the embodiments.

DESCRIPTION OF EMBODIMENTS

To make a person skilled in the art understand the technical solutions in the present disclosure better, the following describes the technical solutions in the embodiments of the present disclosure with reference to the accompanying drawings in the embodiments of the present disclosure.

Figure 1:
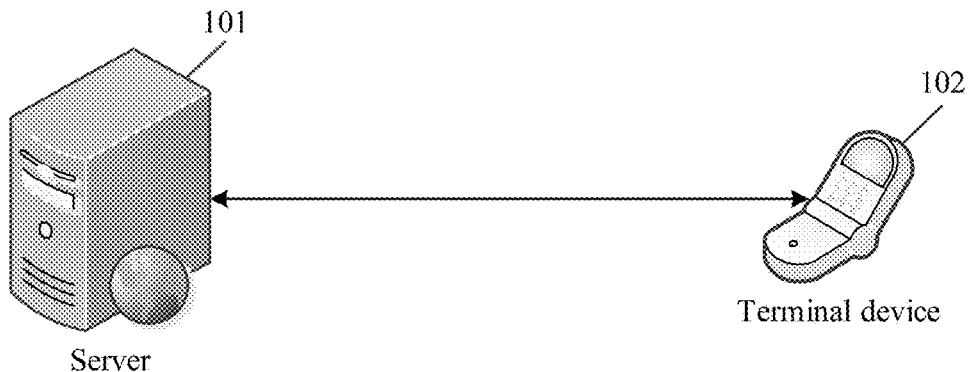
FIG. 1 is a schematic diagram of an application scenario of a video picture encoding and decoding method according to an embodiment of the present disclosure.

FIG. 1 is a schematic diagram of an application scenario of a video picture encoding and decoding method according to an embodiment of the present disclosure. As shown in FIG. 1, the application scenario includes a server 101 and a terminal device 102. The server 101 and the terminal device communicate with each other in a wired communications mode or a wireless communications mode. The wireless communications mode includes General Packet Radio Service (GPRS), third generation (3G), fourth generation (4G), fifth generation (5G), ZIGBEE, Wi-Fi, BLUETOOTH, WIMAX, and the like. For ease of representation, the foregoing communication link is represented merely using a double-arrow solid line.

The terminal device 102 is also referred to as user equipment (UE), and is a device that can connect to the internet and that is used to provide voice and/or data connectivity for users, for example, VR glasses, a VR helmet, a mobile phone, a tablet computer, a notebook computer, a palmtop computer, a desktop computer, a digital television, a VR all-in-one machine, a mobile internet device (MID), or a wearable device such as a smart watch, a smart band, or a pedometer.

In a VR application, the server 101 divides a panoramic picture of a video into M sub-regions, and performs motion search encoding on each of the M sub-regions, with a motion search range not exceeding a sub-region boundary, to obtain M secondary sub-region bitstreams. The terminal device 102 obtains a primary sub-region bitstream corresponding to a target sub-picture of the panoramic picture, where the primary sub-region bitstream includes N secondary sub-region bitstreams. The terminal device 102 parses the primary sub-region bitstream to obtain a reconstructed picture, where the reconstructed picture includes N sub-regions, and the N sub-regions one-to-one correspond to the N secondary sub-region bitstreams. The terminal device 102 performs cross-sub-region-boundary out-loop filtering on the reconstructed picture when an out-loop filtering identifier instructs to perform cross-sub-region-boundary out-loop filtering on the reconstructed picture, to obtain a filtered reconstructed picture. The terminal device 102 adjusts a location of at least one of the N sub-regions in the filtered reconstructed picture to obtain the target sub-picture.

Figure 2:
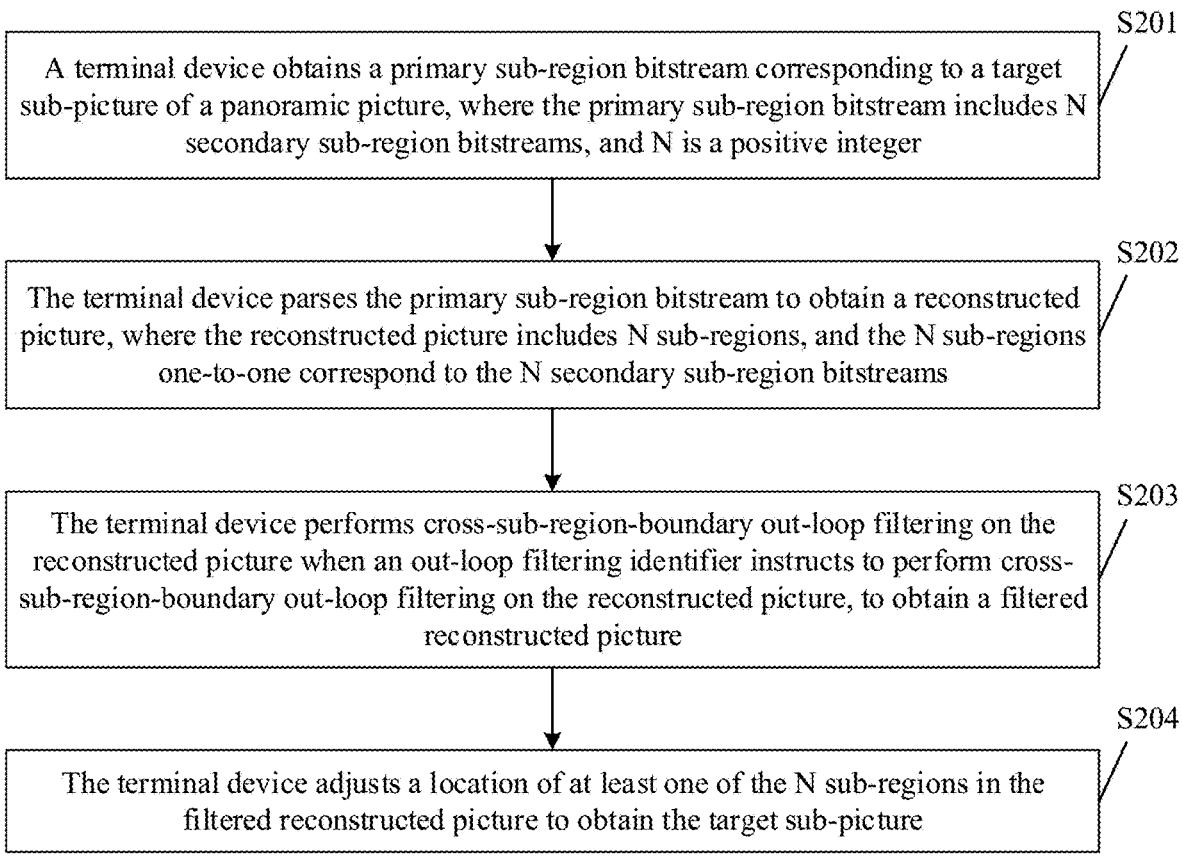
FIG. 2 is a schematic flowchart of a video picture encoding and decoding method according to an embodiment of the present disclosure.

FIG. 2 is a schematic flowchart of a video picture encoding and decoding method according to an embodiment of the present disclosure. As shown in FIG. 2, the method includes the following steps.

S201. A terminal device obtains a primary sub-region bitstream corresponding to a target sub-picture of a panoramic picture, where the primary sub-region bitstream includes N secondary sub-region bitstreams, and N is a positive integer.

It should be noted that the target sub-picture is a picture that is in the panoramic picture and that corresponds to information about a visual angle of a user, that is, the target sub-picture is a part of the panoramic picture.

The obtaining a primary sub-region bitstream of a panoramic picture includes obtaining the N secondary sub-region bitstreams, and assembling the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

For details about the second SEI of each of the N secondary sub-region bitstreams, refer to Table 1 below. Table 1 is a syntax element table of the second SEI.

| | Description |
|---|---|
| region_neighbour_info_deblocking( ) { | |
|   current_region_id | ue(v) |
|   exist_mask_subregion | u(4) |
|   if(exist_mask_subregion&0x08) neighbour_up_id | ue(v) |
|   if(exist_mask_subregion&0x04) neighbour_down_id | ue(v) |
|   if(exist_mask_subregion&0x02) neighbour_left_id | ue(v) |
|   if(exist_mask_subregion&0x01) neighbour_right_id | ue(v) |
| } | ue(v) |

The following describes meanings of the syntax elements in the SEI syntax element table. It is assumed that the SEI is in a secondary sub-region bitstream corresponding to a sub-region A.

The syntax element current_region_id is used to indicate a number of the sub-region A.

The syntax element exist_mask_subregion is used to indicate whether an adjacent sub-region exists in up, down, left, and right directions of the sub-region A. The syntax element includes a total of four bits. A low-order bit to a high-order bit respectively indicate whether an adjacent sub-region exists in the up, down, left, and right directions.

If an adjacent sub-region exists, a corresponding bit is set to 1, or if an adjacent sub-region does not exist, a corresponding bit is set to 0.

When the 1st bit (a highest-order bit to a lowest-order bit are sequentially the $1^{st}$ bit, the $2^{nd}$ bit, the $3^{rd}$ bit, and the $4^{th}$ bit) of the syntax element exist_mask_subregion is 1, the syntax element neighbour_up_id is used to indicate a number of an adjacent sub-region above the sub-region A, when the $2^{nd}$ bit of the syntax element exist_mask_subregion is 1, the syntax element neighbour_down_id is used to indicate a number of an adjacent sub-region below the sub-region A, when the $3^{rd}$ bit of the syntax element exist_mask_subregion is 1, the syntax element neighbour_left_id is used to indicate a number of an adjacent sub-region on the left of the sub-region A, and when the $4^{th}$ bit of the syntax element exist_mask_subregion is 1, the syntax element neighbour_right_id is used to indicate a number of an adjacent sub-region on the right of the sub-region A.

Figures 3, 4A, 4B, 5:
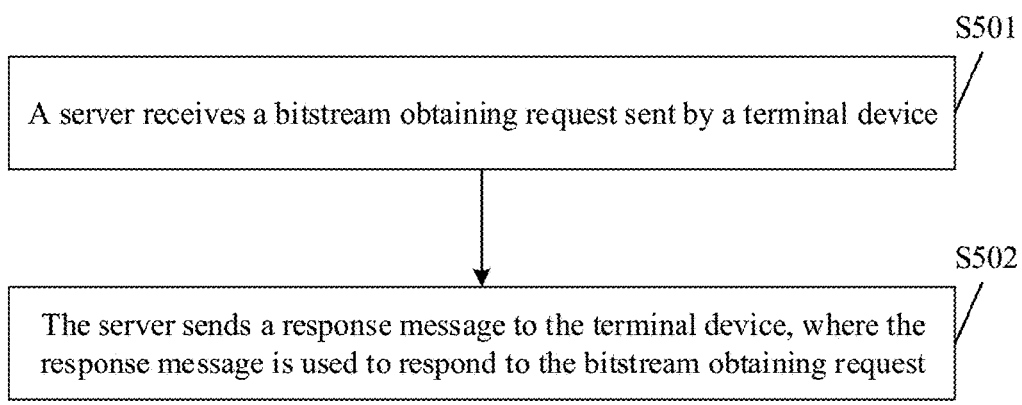
FIG. 3 is a schematic diagram of a panoramic picture division result according to an embodiment of the present disclosure.
FIG. 4A and FIG. 4B are schematic diagrams of a video picture encoding and decoding process according to an embodiment of the present disclosure.
FIG. 5 is a schematic flowchart of another video picture encoding and decoding method according to an embodiment of the present disclosure.

For example, FIG. 3 is a schematic diagram of a panoramic picture division result according to an embodiment of the present disclosure. As shown in FIG. 5, the panoramic picture is divided into 36 sub-regions, and the 36 sub-regions are numbered. A numbering result is shown in FIG. 3. The server separately numbers the 36 sub-regions to obtain 36 secondary sub-region bitstreams. The 36 secondary sub-region bitstreams one-to-one correspond to the 36 sub-regions. Each of the 36 secondary sub-region bitstreams includes second SEI of the region_neighbour_info_deblocking( ) function. Using a sub-region numbered as "a00" in FIG. 3 as an example, sub-regions adjacent to the sub-region "a00" exist on the left and right of the sub-region "a00" and below the sub-region "a00". A number of an adjacent sub-region on the left of the sub-region "a00" is "a05", a number of an adjacent sub-region on the right of the sub-region "00" is "a01", and a number of an adjacent sub-region below the sub-region "a00" is "a10". Therefore, information of region_neighbour_info_deblocking of the sub-region "a00" is as follows current_region_id="a00", exist_mask_subregion=0x7, neighbour_down_id="a10", neighbour_left_id="a05" (leftmost content and rightmost content in the panoramic division diagram are continuous), neighbour_right_id="a01".

The terminal device generates the sub-region information based on the second SEI of each of the N secondary sub-region bitstreams. The sub-region information is used to identify each of the N sub-regions and a sub-region adjacent to the sub-region. The sub-region information is used to identify a number of each of the N sub-regions and a number of a sub-region adjacent to the sub-region.

In a feasible embodiment, the first SEI includes the sub-region information, and the terminal device adds the first SEI to the primary sub-region bitstream. For details about the first SEI, refer to Table 2 below. Table 2 is a syntax element table of the first SEI.

| | Description |
|---|---|
| assemble_region_neighbour_info_deblocking( ){ | |
|   num_tile_minus1 | ue(v) |
|   for(j=0; j<=num_tile_minus1; j++){ | |
|     current_tile_region_id[j]; | ue(v) |
|     exist_mask_subregion[j] | u(4) |
|     if(exist_mask_subregion[j]&0x80) neighbour_up_id[j] | ue(v) |

| | Description |
|---|---|
| if(exist_mask_subregion[j]&0x40) neighbour_down_id[j] | ue(v) |
| if(exist_mask_subregion[j]&0x20) neighbour_left_id[j] | ue(v) |
| if(exist_mask_subregion[j]&0x10) neighbour_right_id[j] | ue(v) |
| } | |
| } | |

The following describes meanings of the syntax elements in the SEI syntax element table.

The syntax element num_tile_minus1 is used to identify a quantity of secondary sub-region bitstreams in the primary sub-region bitstream or a quantity of sub-regions corresponding to a secondary sub-region bitstream in the primary sub-region bitstream. A value of the syntax element num_tile_minus1 may be calculated based on a syntax element num_tile_columns_minus1 and a syntax element num_tile_rows_minus1 in PPS information in other approaches. A specific calculation formula is as follows num_tile_minus1=(num_tile_columns_minus1+1)× (num_tile_rows_minus1+1)−1.

The syntax element num_tile_columns_minus1 is equal to a quantity of columns of a plurality of sub-regions into which a panoramic picture corresponding to the PPS is divided minus 1. A value of the syntax element num_tile_rows_minus1 is equal to a quantity of rows of the plurality of sub-regions into which the panoramic picture corresponding to the PPS is divided minus 1.

The syntax element current_tile_region_id[j] indicates a number of the $j^{th}$ sub-region.

The syntax element exist_mask_subregion[j] is used to indicate whether an adjacent sub-region exists in up, down, left, and right directions of the $j^{th}$ sub-region. A value of the syntax element exist_mask_subregion[j] is a value that is of a syntax element exist_mask_subregion and that is obtained from region_neighbour_info_deblocking of second SEI of a secondary sub-region bitstream corresponding to the $j^{th}$ sub-region. The syntax element includes a total of four bits. A low-order bit to a high-order bit respectively indicate whether an adjacent sub-region exists in the up, down, left, and right directions. If an adjacent sub-region exists, a corresponding bit is set to 1, or if an adjacent sub-region does not exist, a corresponding bit is set to 0.

When the $1^{st}$ bit (a highest-order bit to a lowest-order bit are sequentially the $1^{st}$ bit, the $2^{nd}$ bit, the $3^{rd}$ bit, and the $4^{th}$ bit) of the syntax element exist_mask_subregion[i] is 1, the syntax element neighbour_up_id[j] is used to indicate a number of an adjacent sub-region above the $j^{th}$ sub-region, when the $2^{nd}$ bit of the syntax element exist_mask_subregion[j] is 1, the syntax element neighbour_down_id[j] is used to indicate a number of an adjacent sub-region below the $j^{th}$ sub-region, when the $3^{rd}$ bit of the syntax element exist_mask_subregion[j] is 1, the syntax element neighbour_left_id[j] is used to indicate a number of an adjacent sub-region on the left of the $j^{th}$ sub-region, and when the $4^{th}$ bit of the syntax element exist_mask_subregion [j] is 1, the syntax element neighbour_right_id[j] is used to indicate a number of an adjacent sub-region on the right of the $i^{th}$ sub-region.

It should be noted that a value of the syntax element neighbour_up_id[i] is a value that is of a syntax element neighbour_up_id and that is obtained from region_neighbour_info_deblocking of the second SEI of the secondary sub-region bitstream corresponding to the $j^{th}$ sub-region, a value of the syntax element neighbour_down_id[j] is a value that is of a syntax element neighbour_down_id and that is obtained from region_neighbour_info_deblocking of the second SEI of the secondary sub-region bitstream corresponding to the $j^{th}$ sub-region, a value of the syntax element neighbour_left_id[j] is a value that is of a syntax element neighbour_left_id and that is obtained from region_neighbour_info_deblocking of the second SEI of the secondary sub-region bitstream corresponding to the $j^{th}$ sub-region, and a value of the syntax element neighbour_right_id[j] is a value that is of a syntax element neighbour_right_id and that is obtained from region_neighbour_info_deblocking of the second SEI of the secondary sub-region bitstream corresponding to the $j^{th}$ sub-region.

After generating the first SEI of the primary sub-region bitstream, the terminal device adds the out-loop filtering identifier to the PPS, the SPS, the VPS, or the first SEI of the primary sub-region bitstream.

In a feasible embodiment, the terminal device adds the out-loop filtering identifier to the PPS of the primary sub-region bitstream. Table 3 is a partial syntax element table of the PPS.

| | Description |
|---|---|
| pic_parameter_set_rbsp( ){ | |
| ... | |
| If(tile_enabled_flag){ | |
| ... | |
| loop_filter_across_tiles_enabled_flag | u(1) |
| if(loop_filter_across_tiles_enabled_flag){ | |
| out_loop_filter_across_tiles_enabled_flag | u(1) |
| } | |
| ... | |
| } | |
| } | |

Meanings of the syntax elements in the foregoing table are as follows.

The syntax element loop_filter_across_tiles_enabled_flag is used to instruct whether to perform smoothing filtering on a sub-region boundary. When a value of the syntax element loop_filter_across_tiles_enabled_flag is 1, it instructs to perform smoothing filtering on the sub-region boundary. In this case, when a value of the syntax element out_loop_filter_across_tiles_enabled_flag is 1, it instructs to perform out-loop filtering on the sub-region boundary, or when a value of the syntax element out_loop_filter_across_tiles_enabled_flag is 0, it instructs to perform in-loop filtering or no filtering on the sub-region boundary. When a value of the syntax element loop_filter_across_tiles_enabled_flag is 0, it instructs to perform no smoothing filtering on the sub-region boundary.

It should be noted that the syntax element out_loop_filter_across_tiles_enabled_flag is the out-loop filtering identifier.

In a feasible embodiment, the obtaining a primary sub-region bitstream of a panoramic picture includes obtaining the N secondary sub-region bitstreams, and assembling the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

That each of the N secondary sub-region bitstreams includes information about a location, in the panoramic picture, of a sub-region corresponding to the secondary sub-region bitstream may be manifested as that a SubPictureCompositionBox function is extended in a sub picture composition (spco) box in a first track of any secondary sub-region bitstream i of the N secondary sub-region bitstreams. The SubPictureCompositionBox function is defined as follows

```
aligned(8) class SubPictureCompositionBox extends TrackGroupTypeBox('spco') {
unsigned int(16) track_x;
unsigned int(16) track_y;
unsigned int(16) track_width;
unsigned int(16) track_height;
unsigned int(16) composition_width;
unsigned int(16) composition_height;
}.
```

Assuming that the secondary sub-region bitstream i corresponds to a sub-region I, meanings of the above syntax elements are as follows.

The syntax element track_x indicates a horizontal coordinate, in the panoramic picture, of an upper-left corner of the sub-region I. The syntax element track_y indicates a vertical coordinate, in the panoramic picture, of the upper-left corner of the sub-region. The syntax element track_width indicates a width of the sub-region I. The syntax element track_height indicates a height of the sub-region I. The syntax element composition_width indicates a width of the panoramic picture. The syntax element composition_height indicates a height of the panoramic picture.

The terminal device may determine a location of the sub-region I in the panoramic picture based on a track in the secondary sub-region bitstream.

It should be noted that the box is translated into "box" in Chinese, and the box is defined in the International Organization for Standardization (ISO)/International Electrotechnical Commission (IEC) 14496-12 standard as "an object-oriented building block defined by a unique type identifier and a length". The box is a basic unit for constituting an ISO base media file format (ISOBMFF) file. The box may include another box In a feasible embodiment, a manner of describing the out-loop filtering identifier in an ISOBMFF-specified file format is added in this embodiment. In the file format, for out-loop filtering, sample entry type:'olft' is added to a track in which the primary sub-region bitstream is encapsulated. When a sample entry name is 'olft', the terminal device performs out-loop filtering on a sub-region boundary, or when a sample entry namebu is not 'olft', the terminal device performs in-loop filtering or no filtering on a sub-region boundary.

The terminal device generates the sub-region information based on information that is included in each of the N secondary sub-region bitstreams and that is about coordinates, in the panoramic picture, of a sub-region corresponding to the secondary sub-region bitstream. The first SEI includes the sub-region information. The primary sub-region bitstream includes the first SEI. Table 4 is a syntax element table of the first SEI.

| | Description |
|---|---|
| assemble_region_composition_info_deblocking( ){ <br> num_tile_minus1 <br>   for(j=0; j<= num_tile_minus1; j++) { <br>     region_loc_x[j] <br>     region_loc_y[j] <br>   } <br>   src_pic_width <br>   src_pic_height <br> } | |

The following describes meanings of the syntax elements in the SEI syntax element table.

The syntax element num_tile_minus1 is used to identify a quantity of secondary sub-region bitstreams in the primary sub-region bitstream or a quantity of sub-regions corresponding to a secondary sub-region bitstream in the primary sub-region bitstream. A value of the syntax element num_tile_minus1 may be calculated based on a syntax element num_tile_columns_minus1 and a syntax element num_tile_rows_minus1 in PPS information in other approaches. A specific calculation formula is as follows num_tile_minus1=(num_tile_columns_minus1+1)× (num_tile_rows_minus1+1)−1.

The syntax element region_loc_x[j] is used to identify a horizontal coordinate, in the panoramic picture, of an upper-left corner of the $j^{th}$ sub-region. A value of the syntax element region_loc_x[j] is equal to a value of track_x in a SubPictureCompositionBox function in a track of a secondary sub-region bitstream corresponding to the $i^{th}$ sub-region.

The syntax element region_loc_y[j] is used to identify a vertical coordinate, in the panoramic picture, of the upper-left corner of the $j^{th}$ sub-region. A value of the syntax element region_loc_y[j] is equal to a value of track_y in the SubPictureCompositionBox function in the sub-region bitstream corresponding to the $j^{th}$ sub-region.

The syntax element src_pic_width is used to identify a width of the panoramic picture. The syntax element src_pic_height is used to identify a height of the panoramic picture.

In a feasible embodiment, the out-loop filtering identifier, the sub-region information, and a track of the primary sub-region bitstream are encapsulated in a same box.

In a feasible embodiment, the obtaining the N secondary sub-region bitstreams includes sending a bitstream obtaining request to a server, where the bitstream obtaining request includes information about a visual angle of a user, and receiving a response message sent by the server to respond to the bitstream obtaining request, where the response message includes the N secondary sub-region bitstreams, and the N secondary sub-region bitstreams correspond to the information about a visual angle of a user.

The terminal device sends the bitstream obtaining request to the server, where the bitstream obtaining request includes the information about a visual angle of a user. After receiving the bitstream obtaining request, the server obtains, based on a table that is of a correspondence between a visual angle of a user and a secondary sub-region bitstream and that is stored on the server, the N secondary sub-region bitstreams corresponding to the information about a visual angle of a user. The terminal device receives the response message sent by the server to respond to the bitstream obtaining request, where the response message includes the N secondary sub-region bitstreams.

In a feasible embodiment, the obtaining the N secondary sub-region bitstreams includes obtaining, from a server, a secondary sub-region bitstream corresponding to the panoramic picture, and obtaining, from the secondary sub-region bitstream corresponding to the panoramic picture, N secondary sub-region bitstreams corresponding to the information about a visual angle of a user.

After the panoramic picture is divided into M sub-regions, the server encodes the M sub-regions to obtain M secondary sub-region bitstreams. After obtaining the M secondary sub-region bitstreams corresponding to the panoramic picture from the server, the terminal device obtains the N secondary sub-region bitstreams corresponding to the information about a visual angle of a user from the M secondary sub-region bitstreams based on a table that is of a correspondence between a visual angle of a user and a secondary sub-region bitstream and that is stored on the terminal device.

In a feasible embodiment, after obtaining the secondary sub-region bitstream corresponding to the panoramic picture, the terminal device converts the information about a visual angle of a user into a longitude and latitude range, and then selects, from the secondary sub-region bitstream corresponding to the panoramic picture, N secondary sub-region bitstreams corresponding to a sub-region within the longitude and latitude range.

In a feasible embodiment, the obtaining a primary sub-region bitstream includes sending a bitstream obtaining request to a server, where the bitstream obtaining request includes the information about a visual angle of a user, and receiving a response message sent by the server to respond to the bitstream obtaining request, where the response message includes the primary sub-region bitstream, and the N secondary sub-region bitstreams included in the primary sub-region bitstream correspond to the information about a visual angle of a user.

After the terminal device sends the bitstream obtaining request to the server, the server obtains, based on a table of a correspondence between a visual angle of a user and a sub-region, the N secondary sub-region bitstreams corresponding to the information about a visual angle of a user from a secondary sub-region bitstream corresponding to the panoramic picture. The server assembles the N secondary sub-region bitstreams into the primary sub-region bitstream. The terminal device receives the response message sent by the server to respond to the bitstream obtaining request, where the response message includes the primary sub-region bitstream.

In a feasible embodiment, after the server receives the bitstream obtaining request, where the bitstream obtaining request includes the information about a visual angle of a user, the server converts the information about a visual angle of a user into a longitude and latitude range, and then selects, from a secondary sub-region bitstream corresponding to the panoramic picture, N secondary sub-region bitstreams corresponding to a sub-region within the longitude and latitude range. The server assembles the N secondary sub-region bitstreams into the primary sub-region bitstream. The terminal device receives the response message sent by the server to respond to the bitstream obtaining request, where the response message includes the primary sub-region bitstream.

The encapsulating the out-loop filtering identifier and a track of the primary sub-region bitstream in a same box is defining a new box:'olft' in ProjectedOmniVideoBox ('covi') in an Omnidirectional Media Format (OMAF) file format, including encapsulating region relationship information of the track of the primary sub-region bitstream.

The new box:'olft' is defined as follows

```
aligned(8) class outLoopFilterAcrossTilesBox extends FullBox('olft',0,0){
unsigned int(1) out_loop_filter_across_tiles_enabled_flag;
unsigned int(8) current_region_id
unsigned int(4) exist_mask_subregion;
unsigned int(8) neighbour_up_id;
unsigned int(8) neighbour_down_id;
unsigned int(8) neighbour_left_id;
unsigned int(8) neighbour_right_id;
  bit(3) reserved=0;
}.
```

Meanings of the above syntax elements are as follows.

The syntax element out_loop_filter_across_tiles_enabled_flag is the out-loop filtering identifier. When a value of the syntax element out_loop_filter_across_tiles_enabled_flag is 1, it instructs to perform out-loop filtering on a sub-region boundary, or when a value of the syntax element out_loop_filter_across_tiles_enabled_flag is 0, it instructs to perform in-loop filtering or no filtering on a sub-region boundary.

The syntax element current_region_id is used to identify a number of a current sub-region. The syntax element exist_mask_subregion is used to identify whether an adjacent sub-region exists in up, down, left, and right directions of the current sub-region. The syntax element includes a total of four bits. A low-order bit to a high-order bit respectively indicate whether an adjacent sub-region exists in the up, down, left, and right directions. If an adjacent sub-region exists, a corresponding bit is set to 1, or if an adjacent sub-region does not exist, a corresponding bit is set to 0.

When the $1^{st}$ bit (a highest-order bit to a lowest-order bit are sequentially the $1^{st}$ bit, the $2^{nd}$ bit, the $3^{rd}$ bit, and the $4^{th}$ bit) of the syntax element exist_mask_subregion is 1, the syntax element neighbour_up_id[j] is used to identify a number of an adjacent sub-region above the current sub-region, when the $2^{nd}$ bit of the syntax element exist_mask_subregion is 1, the syntax element neighbour_down_id is used to identify a number of an adjacent sub-region below the current sub-region, when the $3^{rd}$ bit of the syntax element exist_mask_subregion is 1, the syntax element neighbour_left_id is used to identify a number of an adjacent sub-region on the left of the $j^{th}$ sub-region, and when the $4^{th}$ bit of the syntax element exist_mask_subregion is 1, the syntax element neighbour_right_id is used to identify a number of an adjacent sub-region on the right of the current sub-region.

S202. The terminal device parses the primary sub-region bitstream to obtain a reconstructed picture, where the reconstructed picture includes N sub-regions, and the N sub-regions one-to-one correspond to the N secondary sub-region bitstreams.

The parsing, by the terminal device, the primary sub-region bitstream includes performing entropy decoding, intra prediction, and motion compensation on the primary sub-region bitstream to obtain the reconstructed picture.

It should be noted that the entropy decoding, the intra prediction, and the motion compensation belong to common sense of persons skilled in the art, and are not described herein.

S203. The terminal device performs cross-sub-region-boundary out-loop filtering on the reconstructed picture when the out-loop filtering identifier instructs to perform cross-sub-region-boundary out-loop filtering on the reconstructed picture, to obtain a filtered reconstructed picture.

The out-loop filtering identifier includes the syntax element out_loop_filter_across_tiles_enabled_flag in the foregoing PPS. The terminal device determines, based on the syntax element loop_filter_across_tiles_enabled_flag in the foregoing PPS, whether to perform cross-sub-region-boundary filtering on the reconstructed picture. When a value of the syntax element loop_filter_across_tiles_enabled_flag is 0, the terminal device determines not to perform cross-sub-region-boundary smoothing filtering on the reconstructed picture.

When a value of the syntax element loop_filter_across_tiles_enabled_flag is 1, the terminal device determines to perform cross-sub-region-boundary smoothing filtering on the reconstructed picture. Then the terminal device determines, based on the syntax element out_loop_filter_across_tiles_enabled_flag, whether to perform cross-sub-region-boundary out-loop filtering on the reconstructed picture. When a value of the syntax element out_loop_filter_across_tiles_enabled_flag is 0, the terminal device performs cross-sub-region-boundary in-loop filtering on the reconstructed picture, or when a value of the syntax element out_loop_filter_across_tiles_enabled_flag is 1, the terminal device performs cross-sub-region-boundary out-loop filtering on the reconstructed picture.

The performing cross-sub-region-boundary out-loop filtering on the reconstructed picture when the out-loop filtering identifier instructs to perform cross-sub-region-boundary out-loop filtering on the reconstructed picture, to obtain a filtered reconstructed picture includes determining, based on the sub-region information, a sub-region adjacent to any sub-region j of the N sub-regions, determining a target sub-region based on the sub-region adjacent to the sub-region j, where the target sub-region is an overlapping sub-region of the sub-region adjacent to the sub-region j and the N sub-regions, and performing smoothing filtering on a boundary of the sub-region j and a boundary of the target sub-region.

When the terminal device determines, based on the out-loop filtering identifier, that is, the syntax element out_loop_filter_across_tiles_enabled_flag, to perform cross-sub-region-boundary out-loop filtering on the reconstructed picture, a decoder of the terminal device analyzes, based on the first SEI, a number (that is, the syntax element current_tile_region_id[j]) corresponding to the any sub-region j of the N sub-regions constituting the reconstructed picture, determines, based on the syntax element exist_mask_subregion[j] in the first SEI, whether an adjacent sub-region exists in up, down, left, and right directions of the sub-region j, obtains a number of a sub-region adjacent to the sub-region j based on the syntax elements neighbour_up_id[j], neighbour_down_id[j], neighbour_left_id[j], and neighbour_right_id[j] in the first SEI, and determines the target sub-region based on the number of the sub-region adjacent to the sub-region j, where the target sub-region is an overlapping sub-region of the sub-region adjacent to the sub-region j and the N sub-regions included in the reconstructed picture. In other words, the target sub-region is a sub-region that is included in the N sub-regions and that is among sub-regions adjacent to the sub-region j. The terminal device performs, based on the sub-region adjacent to the sub-region j, smoothing filtering on the boundary corresponding to the sub-region j. When the target sub-region does not exist, the terminal device performs no smoothing filtering on the boundary corresponding to the sub-region j.

The terminal device performs the foregoing operation on each sub-region in the reconstructed picture according to the foregoing method, to obtain the filtered reconstructed picture.

It should be noted that the terminal device performs smoothing filtering on the sub-region j using a deblocking filtering method in an HEVC standard in other approaches.

For example, as shown in FIG. 4A, the server divides the panoramic picture into 36 regions, which are respectively numbered as a00 to a55. It is assumed that the terminal device sends, to the server, a bitstream obtaining request including information about a visual angle of a user, and numbers of sub-regions corresponding to the information about a visual angle of a user are a00, a01, a02, a03, a04, a05, a11, a12, a13, and a22. After obtaining sub-region bitstreams corresponding to the sub-regions (that is, the sub-regions numbered as a00, a01, a02, a03, a04, a05, a11, a12, a13, and a22), the terminal device decapsulates and assembles the 10 secondary sub-region bitstreams to obtain a primary sub-region bitstream shown in FIG. 6. The primary sub-region bitstream includes 10 secondary sub-region bitstreams, which respectively correspond to 10 sub-regions.

Using the $1^{st}$ sub-region in FIG. 4B as an example, a number of the sub-region is a00, and a syntax element exist_mask_subregion corresponding to the sub-region is equal to 0x07. This indicates that adjacent sub-regions exist in three directions other than an up direction in the panoramic picture (refer to FIG. 4A). The terminal device determines, based on three values of neighbour_down_id, neighbour_left_id, and neighbour_right_id corresponding to the sub-region a00, that numbers of an adjacent sub-region below the sub-region a00, an adjacent sub-region on the left of the sub-region a00, and an adjacent sub-region on the right of the sub-region a00 are a10, a05, and a01 respectively. Then the terminal device determines the target sub-region based on the sub-region a10, the sub-region a05, and the sub-region a01. Because the sub-region a01 and the sub-region a05 are included in the N sub-regions, the target sub-region includes the sub-region a01 and the sub-region a05. The terminal device performs smoothing filtering on a left boundary of the sub-region a01 and a right boundary of the sub-region a00, and performs smoothing filtering on a right boundary of the sub-region a05 and a left boundary of the sub-region a00. By analogy, the terminal device performs the foregoing operation on the 10 sub-regions included in the reconstructed picture shown in FIG. 6.

The terminal device performs the foregoing operation on each of the 10 sub-regions in the reconstructed picture according to the foregoing method, to obtain the filtered reconstructed picture.

In a feasible embodiment, the performing cross-sub-region-boundary out-loop filtering on the reconstructed picture when the out-loop filtering identifier instructs to perform cross-sub-region-boundary out-loop filtering on the reconstructed picture, to obtain a filtered reconstructed picture includes determining, based on the sub-region information, a sub-region adjacent to any sub-region j of the N sub-regions, obtaining a target sub-region from the sub-region adjacent to the sub-region j, where the target sub-region is an overlapping sub-region of the sub-region adjacent to the sub-region j and the N sub-regions, and performing smoothing filtering on a boundary of the sub-region j and a boundary of the target sub-region.

When determining, based on the out-loop filtering identifier, that is, the syntax element out_loop_filter_across_tiles_enabled_flag, to perform cross-sub-region-boundary out-loop filtering on the reconstructed picture, the terminal device parses assemble_region_composition_info_deblocking in the first SEI of the primary sub-region bitstream, to obtain a location, in the panoramic picture, of an upper-left corner of the any sub-region j of the N sub-regions, and obtains, based on a size of the sub-region j, adjacent sub-regions in up, down, left, and right directions of the sub-region j in the reconstructed picture. Then the terminal device obtains a target sub-region from the sub-regions adjacent to the sub-region j, where the target sub-region is an overlapping sub-region of the sub-regions adjacent to the sub-region j and the N sub-regions in the reconstructed picture. In other words, the target sub-region is a sub-region that is included in the N sub-regions in the reconstructed picture and that is among the sub-regions adjacent to the sub-region j. The terminal device performs smoothing filtering on a corresponding boundary of the sub-region j based on a boundary of the target sub-region.

It should be noted that when performing entropy decoding, intra prediction, and motion compensation processing on the primary sub-region bitstream to obtain the reconstructed picture, the terminal device further outputs quantization information. The performing, by the terminal device, smoothing filtering on a corresponding boundary of the sub-region j based on a boundary of the target sub-region includes determining, by the terminal device based on the quantization information and a pixel gradient of the boundary of the sub-region j adjacent to the target sub-region, whether to perform smoothing filtering on the boundary and determining a corresponding filtering strength.

For example, it is assumed that a resolution of the panoramic picture is 3840×1920, and as shown in FIG. 4A, the panoramic picture is divided into 36 sub-regions, which are respectively numbered as a00 to a55. A resolution of each of the 36 sub-regions is 640×320. Element values in SubPictureCompositionBox of a secondary sub-region bitstream corresponding to a sub-region numbered as a00 are (0, 0, 640, 320, 3840, 1920), which respectively correspond to syntax elements track_x, track_y, track_width, track_height, composition_width, and composition_height in SubPictureCompositionBox, element values in SubPictureCompositionBox of a secondary sub-region bitstream corresponding to a sub-region numbered as a01 are (640, 0, 640, 320, 3840, 1920), which respectively correspond to syntax elements track_x, track_y, track_width, track_height, composition_width, and composition_height in SubPictureCompositionBox, and so on.

The terminal device obtains, from the server based on the information about a visual angle of a user, secondary sub-region bitstreams corresponding to sub-regions numbered as a00, a01, a02, a03, a04, a05, a11, a12, a13, and a22, and assembles the 10 secondary sub-region bitstreams into a primary sub-region bitstream. The terminal device generates first SEI based on a first track in the 10 secondary sub-region bitstreams. A value of a syntax element src_pic_width in assemble_region_composition_info_deblocking of the first SEI is 3840, and a value of a syntax element src_pic_height is 1920. Element values of region_loc_x and region_loc_y corresponding to each of the 10 sub-regions are equal to values of track_x and track_y in SubPictureComposition-Box of each of the sub-region bitstreams numbered as a00, a01, a02, a03, a04, a05, a11, a12, a13, and a22, respectively.

As shown in FIG. 4B, a boundary of the sub-region a00 is processed. Coordinates of an upper-left corner of the sub-region a00 in the panoramic picture are (0, 0). A size of the sub-region a00 is 640×320 (the size of the sub-region may be determined based on a sub-region division parameter and a width and a height of the reconstructed picture that are in a code rate parameter set). Content of a sub-region on the left of the sub-region a00 and content of a rightmost sub-region in the panoramic picture are continuous (content on the left and right of a longitude and latitude diagram is continuous). Therefore, a horizontal coordinate of a column of pixels adjacent to the left of the sub-region a00 is 3839 (that is, a syntax element src_pic_width 1), and a value range of a vertical coordinate is 0-319. This column falls within a range of the sub-region a05. Therefore, the terminal device determines that an adjacent sub-region on the left of the sub-region a00 is a05. Likewise, the terminal device determines that an adjacent sub-region on the right of the sub-region a00 is the sub-region a01, and an adjacent sub-region below the sub-region a00 is the sub-region a10. The terminal device determines, based on the sub-region a01, the sub-region a05, and the sub-region a10, that the target sub-region includes the sub-region 01 and the sub-region a05. The terminal device performs smoothing filtering on a left boundary of the sub-region a00 and a right boundary of a05, and performs smoothing filtering on a right boundary of the sub-region a00 and a left boundary of the sub-region a01. A specific filtering method is an in-loop deblocking filtering technology in an HEVC standard in other approaches. By analogy, the terminal device separately performs the foregoing operation on all sub-regions in the reconstructed picture to obtain the filtered reconstructed picture.

In a feasible embodiment, a media presentation description MPD file includes the sub-region information and the out-loop filtering identifier, and before the performing cross-sub-region-boundary out-loop filtering on the reconstructed picture when the out-loop filtering identifier instructs to perform cross-sub-region-boundary out-loop filtering on the reconstructed picture, to obtain a filtered reconstructed picture, the method further includes obtaining the MPD file, and the performing cross-sub-region-boundary out-loop filtering on the reconstructed picture includes obtaining the sub-region information from the MPD file, and performing cross-sub-region-boundary out-loop filtering on the reconstructed picture based on the sub-region information.

The MPD file describes a motion-vector-constrained sub-region bitstream prediction manner. An example of describing a sub-region motion vector in the MPD file on the server is as follows

```
<?xml version="1.0"encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
```

-continued

```
    <!—Tile 0—>
    <AdaptationSet  segmentAlignment="true"  subsegmentAlignment="true"
subsegmentStartsWithSAP="1">
    <EssentialProperty schemeIdUri="urn:mpeg:dash:olft:2014" value="0,7,0,10,5,1"/>
    <Representation  mimeType="video/mp4"  codecs="avc1.42c00d"  width="640"
height="320"bandwidth="79707" startWithSAP="1">
        <BaseURL> tile1.mp4</BaseURL>
    <SegmentBase indexRangeExact="true" indexRange="837-988"/>
        </Representation>
    </AdaptationSet>
    <!—-Tile—>
    <AdaptationSet  segmentAlignment="true"  subsegmentAlignment="true"
subsegmentStartsWithSAP="1">
    <EssentialProperty schemeIdUri="urn:mpeg:dash:olft:2014" value="1,7,0,11,0,2"/>
    <Representation  mimeType="video/mp4"  codecs="avc1.42c00d"  width="640"
height="640" bandwidth="79707" startWithSAP="1">
        <BaseURL> tile1.mp4</BaseURL>
    <SegmentBase indexRangeExact="true"indexRange="837-988"/>
        </Representation>
    </AdaptationSet>
    ...
    </Period>
</MPD>.
```

When the MPD file includes the sub-region information and the out-loop filtering identifier, the terminal device identifies, using a new EssentialProperty attribute olft@value in the MPD file, a number of the sub-region and numbers of adjacent sub-regions in up, down, left, and right directions of the sub-region. olft@value includes syntax elements current_tile_region_id, exist_mask_subregion, neighbour_up_id, neighbour_down_id, neighbour_left_id, and neighbour_right_id.

Meanings of the above syntax elements are as follows.

The syntax element current_region_id is used to identify a number of a current sub-region. The syntax element exist_mask_subregion is used to identify whether an adjacent sub-region exists in up, down, left, and right directions of the current sub-region. The syntax element includes a total of four bits. A low-order bit to a high-order bit respectively indicate whether an adjacent sub-region exists in the up, down, left, and right directions. If an adjacent sub-region exists, a corresponding bit is set to 1, or if an adjacent sub-region does not exist, a corresponding bit is set to 0.

When the $1^{st}$ bit (a highest-order bit to a lowest-order bit are sequentially the $1^{st}$ bit, the $2^{nd}$ bit, the $3^{rd}$ bit, and the $4^{th}$ bit) of the syntax element exist_mask_subregion is 1, the syntax element neighbour_up_id[j] is used to identify a number of an adjacent sub-region above the current sub-region, when the $2^{nd}$ bit of the syntax element exist_mask_subregion is 1, the syntax element neighbour_down_id is used to identify a number of an adjacent sub-region below the current sub-region, when the $3^{rd}$ bit of the syntax element exist_mask_subregion is 1, the syntax element neighbour_left_id is used to identify a number of an adjacent sub-region on the left of the $j^{th}$ sub-region, and when the $4^{th}$ bit of the syntax element exist_mask_subregion is 1, the syntax element neighbour_right_id is used to identify a number of an adjacent sub-region on the right of the current sub-region.

In addition, in the representation field in the MPD file, information used to identify the number of the sub-region and the numbers of the adjacent sub-regions in the up, down, left, and right directions of the sub-region may also be added.

The terminal device determines, depending on whether the EssentialProperty attribute olft@value exists in the MDP file, whether to perform out-loop filtering on the sub-region. When the EssentialProperty attribute olft@value exists in the MDP file, the terminal device performs out-loop filtering on the sub-region, or when the EssentialProperty attribute olft@value does not exist in the MDP file, the terminal device performs in-loop filtering or no filtering on the sub-region.

In a feasible embodiment, the terminal device assembles the N secondary sub-region bitstreams into the primary sub-region bitstream, and encapsulates, into a second track, the primary sub-region bitstream based on information that is included in each of the N secondary sub-region bitstreams and that is about a location, in the panoramic picture, of a sub-region corresponding to the secondary sub-region bitstream. SubFovCompositionBox is extended in a spco box of the second track. SubFovCompositionBox is defined as follows

```
aligned(8) class SubFovPictureCompositionBox extends TrackGroupTypeBox('spco')
{
    unsigned int(8) num_subregions;
    for(j=0; j<num_subregions; j++) {
    unsigned int(16) track_x[j];
    unsigned int(16) track_y[j];
    }
    unsigned int(16) composition_width;
    unsigned int(16) composition_height;
}.
```

Meanings of the above syntax elements are as follows.

The syntax element num_subregions is used to identify a quantity of secondary sub-region bitstreams in the primary sub-region bitstream. The syntax element track_x[j] is used to identify a horizontal coordinate, in the panoramic picture, of an upper-left corner of a sub-region corresponding to the $j^{th}$ secondary sub-region bitstream in the primary sub-region bitstream. A value of the syntax element track_x[j] is equal to a value of track_x in SubPictureCompositionBox in the $j^{th}$ secondary sub-region bitstream. The syntax element track_y [j] is used to identify a vertical coordinate, in the panoramic picture, of the upper-left corner of the sub-region corresponding to the $j^{th}$ secondary sub-region bitstream in the primary sub-region bitstream. A value of the syntax element track_y[j] is equal to a value of track_y in SubPictureCompositionBox in the $j^{th}$ secondary sub-region bitstream. The syntax element composition_width is used to identify a width of the panoramic picture. The syntax element composition_height is used to identify a height of the panoramic picture.

The terminal device determines, based on the first track or the second track of the primary sub-region bitstream, a location, in the panoramic picture, of a sub-region corresponding to each of the N secondary sub-region bitstreams in the primary sub-region bitstream.

After performing processing, such as entropy decoding, intra prediction, and motion compensation, on the primary sub-region bitstream to obtain the reconstructed picture, the terminal device may determine, based on related syntax elements in SubFovCompositionBox in the primary sub-region bitstream, a location, in the panoramic picture, of each of the N sub-regions in the reconstructed picture, to determine a sub-region adjacent to each sub-region, and further perform a subsequent smoothing filtering operation to obtain the filtered reconstructed picture.

It should be noted that the performing processing operations, such as entropy decoding, intra prediction, and motion compensation, on the primary sub-region bitstream and the performing filtering on the reconstructed picture by the terminal device are both performed by the decoder of the terminal device.

S204. The terminal device adjusts a location of at least one of the N sub-regions in the filtered reconstructed picture to obtain the target sub-picture.

The filtered reconstructed picture includes the N sub-regions. The terminal device adjusts the location of the at least one of the N sub-regions based on a number or location coordinates corresponding to a sub-region in the filtered reconstructed picture, to obtain the target sub-picture.

It can be learned that in the solution of this embodiment of the present disclosure, the terminal device obtains the primary sub-region bitstream corresponding to the target sub-picture of the panoramic picture, where the primary sub-region bitstream includes the N secondary sub-region bitstreams, and N is a positive integer, parses the primary sub-region bitstream to obtain the reconstructed picture, where the reconstructed picture includes the N sub-regions, and the N sub-regions one-to-one correspond to the N secondary sub-region bitstreams, performs cross-sub-region-boundary out-loop filtering on the reconstructed picture when the out-loop filtering identifier instructs to perform cross-sub-region-boundary out-loop filtering on the reconstructed picture, to obtain the filtered reconstructed picture, and adjusts the location of the at least one of the N sub-regions in the filtered reconstructed picture to obtain the target sub-picture. The solution in this embodiment of the present disclosure helps resolve a problem of content discontinuity resulting from region-based encoding of a video picture with continuous content, thereby improving picture quality. In addition, after the out-loop filtering identifier is added to the primary sub-region bitstream, a standard decoder can not only support conventional in-loop filtering, but also support out-loop filtering, thereby improving adaptability of an encoder.

FIG. 5 is a schematic flowchart of another video picture encoding and decoding method according to an embodiment of the present disclosure. As shown in FIG. 5, the method includes the following steps.

S501. A server receives a bitstream obtaining request sent by a terminal device.

The bitstream obtaining request includes information about a visual angle of a user.

Before the receiving a bitstream obtaining request sent by a terminal device, the method further includes dividing a panoramic picture into M sub-regions, and performing motion search encoding on each of the M sub-regions, with a motion search range not exceeding a sub-region boundary, to obtain M secondary sub-region bitstreams.

The server divides the panoramic picture into the M sub-regions, where the M sub-regions do not overlap each other and have an equal size (that is, resolution). The server numbers the M sub-regions. The server performs intra-sub-region motion search encoding on each of the M sub-regions, to obtain the M secondary sub-region bitstreams. The server encapsulates and stores each of the M secondary sub-region bitstreams.

The response message includes the N secondary sub-region bitstreams, and after the receiving a bitstream obtaining request sent by a terminal device, the method further includes obtaining, from a secondary sub-region bitstream corresponding to the panoramic picture, N secondary sub-region bitstreams corresponding to the information about a visual angle of a user, where N is an integer greater than 1, and M is an integer greater than N.

After the server receives the bitstream obtaining request sent by the terminal device, where the bitstream obtaining request includes the information about a visual angle of a user, the server obtains, from the secondary sub-region bitstream corresponding to the panoramic picture and based on a correspondence between a visual angle of a user and a sub-region, the N secondary sub-region bitstreams corresponding to the information about a visual angle of a user.

In a feasible embodiment, the response message includes a primary sub-region bitstream, the primary sub-region bitstream includes N secondary sub-region bitstreams, and after the receiving a bitstream obtaining request sent by a terminal device, the method further includes obtaining, from a secondary sub-region bitstream corresponding to a panoramic picture, N secondary sub-region bitstreams corresponding to the information about a visual angle of a user, and assembling the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

In a feasible embodiment, the response message includes the primary sub-region bitstream, the primary sub-region bitstream includes N secondary sub-region bitstreams, and after the receiving a bitstream obtaining request sent by a terminal device, the method further includes obtaining, from a secondary sub-region bitstream corresponding to a panoramic picture, N secondary sub-region bitstreams corresponding to the information about a visual angle of a user, and assembling the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

After the server receives the bitstream obtaining request, where the bitstream obtaining request includes the information about a visual angle of a user, the server converts the information about a visual angle of a user into a longitude and latitude range, and then selects, from the secondary sub-region bitstream corresponding to the panoramic picture, N secondary sub-region bitstreams corresponding to a sub-region within the longitude and latitude range. The server assembles the N secondary sub-region bitstreams into the primary sub-region bitstream.

In a feasible embodiment, the first SEI includes the sub-region information.

It should be noted that for a process of assembling the N secondary sub-region bitstreams into the primary sub-region bitstream by the server, reference may be made to related descriptions in step S201. Descriptions are not provided herein again.

In a feasible embodiment, the sub-region information, the out-loop filtering identifier, and a track of the primary sub-region bitstream are encapsulated in a same box, or the sub-region information and the out-loop filtering identifier are encapsulated in a media presentation description MPD file.

S502. The server sends a response message to the terminal device, where the response message is used to respond to the bitstream obtaining request.

The response message includes the N secondary sub-region bitstreams or the primary sub-region bitstream, where the N secondary sub-region bitstreams are used to be assembled into the primary sub-region bitstream.

The server sends the response message to the terminal device, where the response message includes the N secondary sub-region bitstreams or the primary sub-region bitstream.

It should be noted that for descriptions of this embodiment, reference may be made to related descriptions in the embodiment shown in FIG. 2. Descriptions are not provided herein again.

Figure 6:
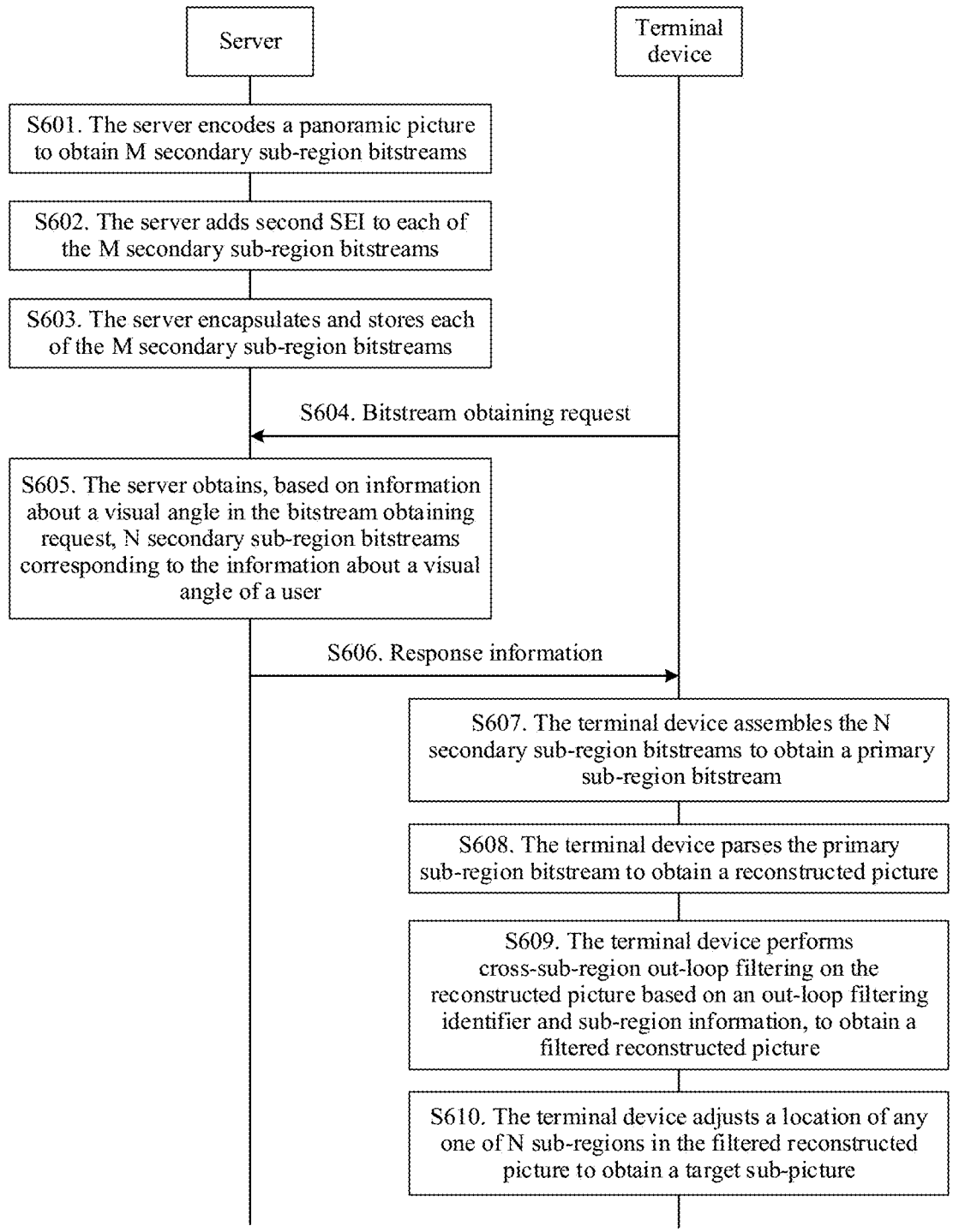
FIG. 6 is a schematic flowchart of another video picture encoding and decoding method according to an embodiment of the present disclosure.

FIG. 6 is a schematic flowchart of another video picture encoding and decoding method according to an embodiment of the present disclosure. As shown in FIG. 6, the method includes the following steps.

S601. A server encodes a panoramic picture to obtain M secondary sub-region bitstreams.

M is an integer greater than 1.

The server divides the panoramic picture into M sub-regions, where the M sub-regions are rectangular regions that do not overlap each other. The server includes at least one encoder. The at least one encoder performs motion search encoding on the M sub-regions, with a motion search range not exceeding a sub-region boundary, to obtain the M secondary sub-region bitstreams.

Optionally, any one of the at least one encoder of the server divides the panoramic picture into the M sub-regions according to a tile division manner in an HEVC standard, and encodes the M sub-regions using a motion-constrained tile set (MCTS) encoding method, to obtain a bitstream, where the bitstream is a binary bitstream. Then the server splits the bitstream into M secondary sub-region bitstreams, where the M secondary sub-region bitstreams one-to-one correspond to the M sub-regions.

Further, the server numbers the M sub-regions according to a division sequence of the M sub-regions, that is, numbers of the M sub-regions are consistent with the division sequence of the M sub-regions.

Optionally, the numbers of the M sub-regions may be inconsistent with the division sequence of the M sub-regions.

S602. The server adds second SEI to each of the M secondary sub-region bitstreams.

After numbering the M secondary sub-region bitstreams, the server adds the second SEI to each of the M secondary sub-region bitstreams. The SEI is used to indicate a number of a sub-region corresponding to the secondary sub-region bitstream and a number of a sub-region adjacent to the sub-region corresponding to the secondary sub-region bitstream.

It should be noted that for specific descriptions of the second SEI, reference may be made to the foregoing Table 1. Descriptions are not provided herein again.

S603. The server encapsulates and stores each of the M secondary sub-region bitstreams.

S604. A terminal device sends a bitstream obtaining request to the server.

The bitstream obtaining request includes information about a visual angle of a user. The information about a visual angle of a user is obtained by the terminal device based on user behavior.

S605. The server obtains, based on the information about a visual angle in the bitstream obtaining request, N secondary sub-region bitstreams corresponding to the information about a visual angle of a user.

It should be noted that a correspondence between a visual angle of a user and a sub-region is stored on the server. After receiving the bitstream obtaining request, the server obtains, based on the correspondence between a visual angle of a user and a sub-region, the N secondary sub-region bitstreams from a secondary sub-region bitstream corresponding to the panoramic picture.

Alternatively, after receiving the bitstream obtaining request, the server converts the information about a visual angle of a user into a longitude and latitude range, and then selects, from a secondary sub-region bitstream corresponding to the panoramic picture, N secondary sub-region bitstreams corresponding to a sub-region within the longitude and latitude range.

In a feasible embodiment, the server assembles the N secondary sub-region bitstreams into a primary sub-region bitstream.

S606. The server sends response information to the terminal device to respond to the bitstream obtaining request.

The response information includes the N secondary sub-region bitstreams corresponding to the information about a visual angle or the primary sub-region bitstream.

In a feasible embodiment, the terminal device obtains the secondary sub-region bitstream corresponding to the panoramic picture from the server. The terminal device obtains, based on the information about a visual angle of a user, the N secondary sub-region bitstreams corresponding to the information about a visual angle of a user from the secondary sub-region bitstream corresponding to the panoramic picture.

S607. The terminal device assembles the N secondary sub-region bitstreams to obtain the primary sub-region bitstream.

The terminal device assembles the N secondary sub-regions according to a grating scanning sequence, to obtain the primary sub-region bitstream. During assembly, the terminal device adds an out-loop filtering identifier to a PPS of the primary sub-region bitstream. The out-loop filtering identifier is used to instruct whether to perform cross-sub-region out-loop filtering on a reconstructed picture obtained by performing processing operations, such as entropy decoding, intra prediction, and motion compensation, on the primary sub-region bitstream.

It should be noted that for the PPS of the primary sub-region bitstream, reference may be made to related descriptions in Table 3. Descriptions are not provided herein again.

Further, when assembling the N secondary sub-region bitstreams into the primary sub-region bitstream, the terminal device parses second SEI of each of the N secondary sub-region bitstreams, generates sub-region information based on the second SEI, where the sub-region information is carried in first SEI, and configures the first SEI in the primary sub-region bitstream.

It should be noted that for the first SEI, reference may be made to related descriptions in the foregoing Table 2. Descriptions are not provided herein again.

In a feasible embodiment, the out-loop filtering identifier may be alternatively carried in an SPS, the PPS, a VPS, or the first SEI of the primary sub-region bitstream.

S608. The terminal device parses the primary sub-region bitstream to obtain a reconstructed picture.

The terminal device transfers the primary sub-region bitstream to a decoder of the terminal device, to obtain the reconstructed picture through operations such as entropy decoding, intra prediction, and motion compensation.

It should be noted that the reconstructed picture is composed of N sub-regions corresponding to the N secondary sub-region bitstreams. The entropy decoding, the intra prediction, and the motion compensation belong to common sense of persons skilled in the art, and are not described herein.

S609. The terminal device performs cross-sub-region out-loop filtering on the reconstructed picture based on the out-loop filtering identifier and the sub-region information, to obtain a filtered reconstructed picture.

It should be noted that the out-loop filtering identifier includes a syntax element out_loop_filter_across_tiles_enabled_flag.

In a feasible embodiment, an MPD file includes the sub-region information and the out-loop filtering identifier, and before performing filtering on the reconstructed picture based on the out-loop filtering identifier and the sub-region information, the terminal device obtains the MPD file from the server, obtains the sub-region information from the MPD file, and performs cross-sub-region-boundary out-loop filtering on the reconstructed picture based on the sub-region information.

When the out-loop filtering identifier instructs to perform cross-sub-region-boundary out-loop filtering on the reconstructed picture, the terminal device performs cross-sub-region out-loop filtering on the reconstructed picture based on the first SEI, or when the out-loop filtering identifier instructs to perform cross-sub-region-boundary out-loop filtering on the reconstructed picture, the terminal device performs no cross-sub-region out-loop filtering on the reconstructed picture based on the sub-region information. For specific descriptions, refer to related descriptions in step S203. Descriptions are not provided herein again.

It should be noted that the performing processing operations, such as entropy decoding, intra prediction, and motion compensation, on the primary sub-region bitstream and the performing filtering on the reconstructed picture by the terminal device are both performed by the decoder of the terminal device.

S610. The terminal device adjusts a location of a −+ sub-region in the filtered reconstructed picture to obtain a target sub-picture.

It should be noted that for details about steps S601 to S610, reference may be made to related descriptions in steps S201 to S204. Descriptions are not provided herein again.

Figure 7:
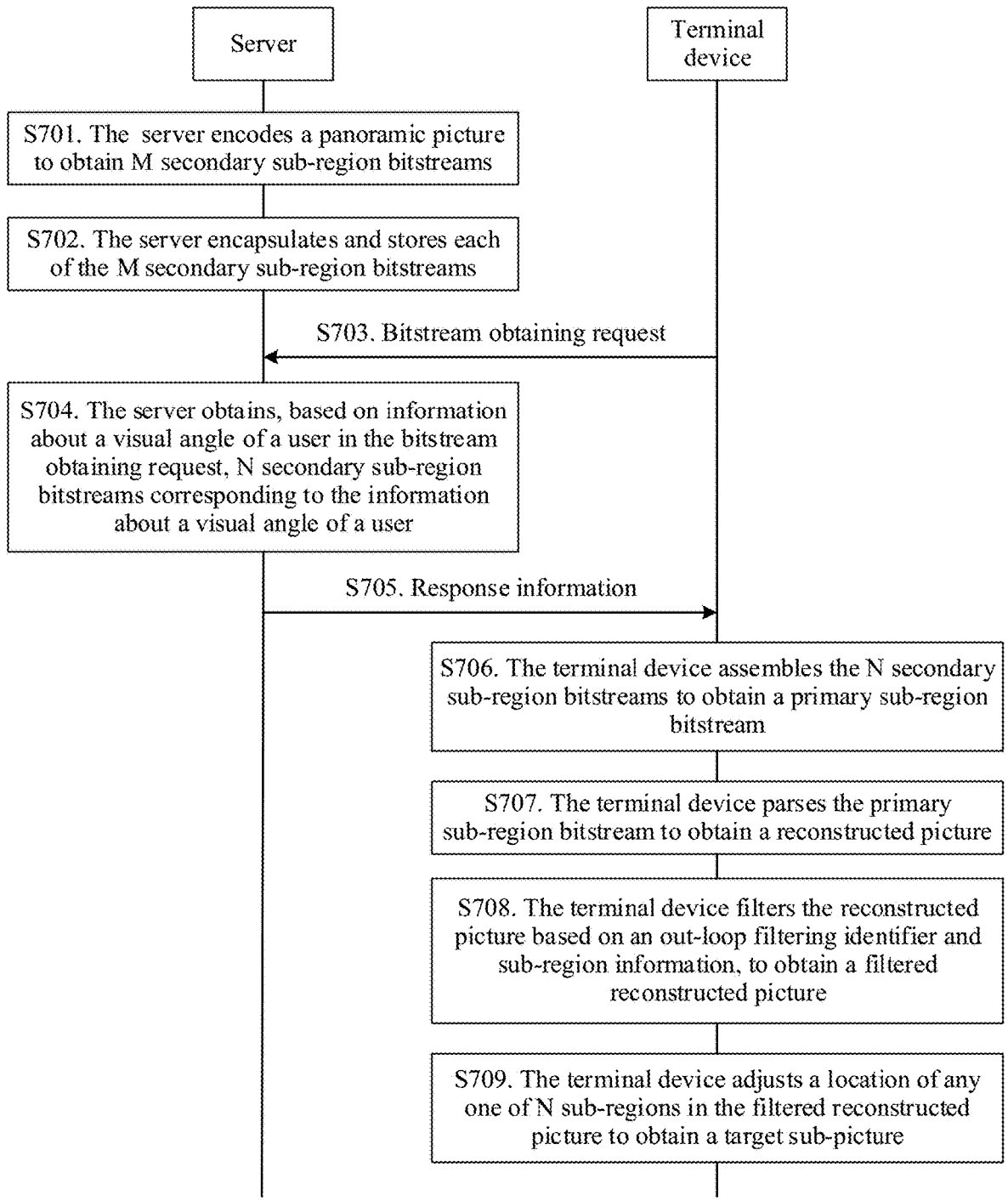
FIG. 7 is a schematic flowchart of another video picture encoding and decoding method according to an embodiment of the present disclosure.

FIG. 7 is a schematic flowchart of another video picture encoding and decoding method according to an embodiment of the present disclosure. As shown in FIG. 7, the method includes the following steps.

S701. A server encodes a panoramic picture to obtain M secondary sub-region bitstreams.

M is an integer greater than 1.

The server divides the panoramic picture into M sub-regions, where the M sub-regions are rectangular regions that do not overlap each other. The M sub-regions have a same size (that is, resolution). The server includes at least one encoder. The at least one encoder performs motion search encoding on the M sub-regions, with a motion search range not exceeding a sub-region boundary, to obtain the M secondary sub-region bitstreams. The M secondary sub-region bitstreams one-to-one correspond to the M sub-regions.

Optionally, any one of the at least one encoder of the server divides the panoramic picture into the M sub-regions according to a tile division manner in an HEVC standard, and encodes the M sub-regions using a MCTS encoding method, to obtain a bitstream, where the bitstream is a binary bitstream. Then the server splits the bitstream into M secondary sub-region bitstreams, where the M secondary sub-region bitstreams one-to-one correspond to the M sub-regions.

Further, the server numbers the M sub-regions according to a division sequence of the M sub-regions, that is, numbers of the M sub-regions are consistent with the division sequence of the M sub-regions.

Optionally, the numbers of the M sub-regions may be inconsistent with the division sequence of the M sub-regions.

S702. The server encapsulates and stores each of the M secondary sub-region bitstreams.

The server encapsulates each of the M secondary sub-region bitstreams based on an OMAF. When encapsulating each of the M secondary sub-region bitstreams, the server encapsulates a sample (which may also be referred to as a first track) into the secondary sub-region bitstream.

It should be noted that for the first track, reference may be made to related descriptions in step S201. Descriptions are not provided herein again.

S703. A terminal device sends a bitstream obtaining request to the server.

The bitstream obtaining request includes information about a visual angle of a user. The information about a visual angle of a user is obtained by the terminal device based on user behavior.

S704. The server obtains, based on the information about a visual angle of a user in the bitstream obtaining request, N secondary sub-region bitstreams corresponding to the information about a visual angle of a user.

It should be noted that a correspondence between a visual angle of a user and a sub-region is stored on the server. After receiving the bitstream obtaining request, the server obtains, based on the correspondence between a visual angle of a user and a sub-region, the N secondary sub-region bitstreams from a secondary sub-region bitstream corresponding to the panoramic picture.

Alternatively, after receiving the bitstream obtaining request, the server converts the information about a visual angle of a user into a longitude and latitude range, and then selects, from a secondary sub-region bitstream corresponding to the panoramic picture, N secondary sub-region bitstreams corresponding to a sub-region within the longitude and latitude range.

In a feasible embodiment, the server assembles the N secondary sub-region bitstreams into a primary sub-region bitstream.

S705. The server sends response information to the terminal device to respond to the bitstream obtaining request.

The response information carries the N secondary sub-region bitstreams corresponding to the information about a visual angle of a user or the primary sub-region bitstream.

In a feasible embodiment, the terminal device downloads, from the server, the secondary sub-region bitstream that corresponds to the panoramic picture and that is encapsulated by the server. The terminal device obtains, based on the information about a visual angle of a user, the N secondary sub-region bitstreams corresponding to the information about a visual angle of a user from the secondary sub-region bitstream corresponding to the panoramic picture.

S706. The terminal device assembles the N secondary sub-region bitstreams to obtain the primary sub-region bitstream.

The terminal device assembles the N secondary sub-region bitstreams according to a grating scanning sequence, to obtain the primary sub-region bitstream. During assembly, the terminal device adds an out-loop filtering identifier to a PPS of the primary sub-region bitstream. The out-loop filtering identifier is used to instruct whether to perform cross-sub-region out-loop filtering on a reconstructed picture obtained by performing entropy decoding, intra prediction, and motion compensation processing on the primary sub-region bitstream.

It should be noted that for some syntax elements of the PPS, reference may be made to related descriptions in the foregoing Table 3. Descriptions are not provided herein again.

In a feasible embodiment, the out-loop filtering identifier may be alternatively carried in first SEI, an SPS, or a VPS.

Further, when assembling the N secondary sub-region bitstreams into the primary sub-region bitstream, the terminal device parses second SEI of each of the N secondary sub-region bitstreams, generates sub-region information based on the second SEI, where the sub-region information is carried in the first SEI, and configures the first SEI in the primary sub-region bitstream.

It should be noted that for the first SEI, reference may be made to related descriptions in the foregoing Table 4. Descriptions are not provided herein again.

In a feasible embodiment, the out-loop filtering identifier may be alternatively carried in an SPS, the PPS, a VPS, or the first SEI of the primary sub-region bitstream.

S707. The terminal device parses the primary sub-region bitstream to obtain a reconstructed picture.

The terminal device transfers the new bitstream to a decoder of the terminal device, to obtain the reconstructed picture through operations such as entropy decoding, intra prediction, and motion compensation.

It should be noted that the reconstructed picture is composed of N sub-regions corresponding to the N secondary sub-region bitstreams. The entropy decoding, the intra prediction, and the motion compensation belong to common sense of persons skilled in the art, and are not described herein.

S708. The terminal device filters the reconstructed picture based on the out-loop filtering identifier and the sub-region information, to obtain a filtered reconstructed picture.

In a feasible embodiment, an MPD file includes the sub-region information and the out-loop filtering identifier, and before performing filtering on the reconstructed picture based on the out-loop filtering identifier and the sub-region information, the terminal device obtains the MPD file from the server, obtains the sub-region information from the MPD file, and performs cross-sub-region-boundary out-loop filtering on the reconstructed picture based on the sub-region information.

When the out-loop filtering identifier instructs to perform cross-sub-region-boundary out-loop filtering on the reconstructed picture, the terminal device performs cross-sub-region out-loop filtering on the reconstructed picture based on the first SEI, or when the out-loop filtering identifier instructs to perform cross-sub-region-boundary out-loop filtering on the reconstructed picture, the terminal device performs no cross-sub-region out-loop filtering on the reconstructed picture based on the first SEI. For specific descriptions, refer to related descriptions in step S203. Descriptions are not provided herein again.

In a feasible embodiment, the terminal device assembles the N secondary sub-region bitstreams into the primary sub-region bitstream, and adds a second track to the primary sub-region bitstream based on information that is included in each of the N secondary sub-region bitstreams and that is about a location, in the panoramic picture, of a sub-region corresponding to the secondary sub-region bitstream. SubFovCompositionBox is extended in a spco box of the second track. SubFovCompositionBox is defined as follows

```
aligned(8) class SubFovPictureCompositionBox extends TrackGroupTypeBox('spco')
{
    unsigned int(8) num_subregions;
    for(j=0; j<num_subregions; j++) {
        unsigned int(16) track_x[j];
        unsigned int(16) track_y[j];
```

```
}
unsigned int(16) composition_width;
unsigned int(16) composition_height;
}.
```

Meanings of the above syntax elements are as follows.

The syntax element num_subregions is used to identify a quantity of secondary sub-region bitstreams in the primary sub-region bitstream. The syntax element track_x[j] is used to identify a horizontal coordinate, in the panoramic picture, of an upper-left corner of a sub-region corresponding to the $j^{th}$ secondary sub-region bitstream in the primary sub-region bitstream. A value of the syntax element track_x[j] is equal to a value of track_x in SubPictureCompositionBox in the $j^{th}$ secondary sub-region bitstream. The syntax element track_y [j] is used to identify a vertical coordinate, in the panoramic picture, of the upper-left corner of the sub-region corresponding to the $j^{th}$ secondary sub-region bitstream in the primary sub-region bitstream. A value of the syntax element track_y[j] is equal to a value of track_y in SubPictureCompositionBox in the $j^{th}$ secondary sub-region bitstream. The syntax element composition_width is used to identify a width of the panoramic picture. The syntax element composition_height is used to identify a height of the panoramic picture.

The terminal device determines, based on the first track or the second track of the primary sub-region bitstream, a location, in the panoramic picture, of a sub-region corresponding to each of the N secondary sub-region bitstreams in the primary sub-region bitstream.

After performing processing, such as entropy decoding, intra prediction, and motion compensation, on the primary sub-region bitstream to obtain the reconstructed picture, the terminal device may determine, based on related syntax elements in SubFovCompositionBox in the primary sub-region bitstream, a location, in the panoramic picture, of each of the N sub-regions in the reconstructed picture, to determine a sub-region adjacent to each sub-region, and further perform a subsequent smoothing filtering operation.

It should be noted that the performing processing operations, such as entropy decoding, intra prediction, and motion compensation, on the primary sub-region bitstream and the performing filtering on the reconstructed picture by the terminal device are both performed by the decoder of the terminal device.

S709. The terminal device adjusts a location of any one of the N sub-regions in the filtered reconstructed picture to obtain a target sub-picture.

It should be noted that for details about steps S701 to S709, reference may be made to related descriptions in steps S201 to S204. Descriptions are not provided herein again.

Figure 8:
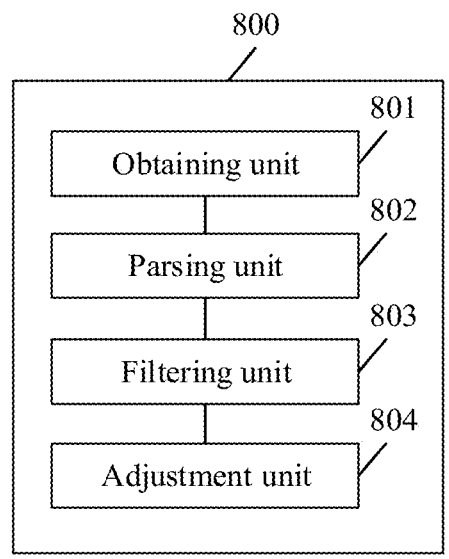
FIG. 8 is a schematic structural diagram of a terminal device according to an embodiment of the present disclosure.
Figure 9:
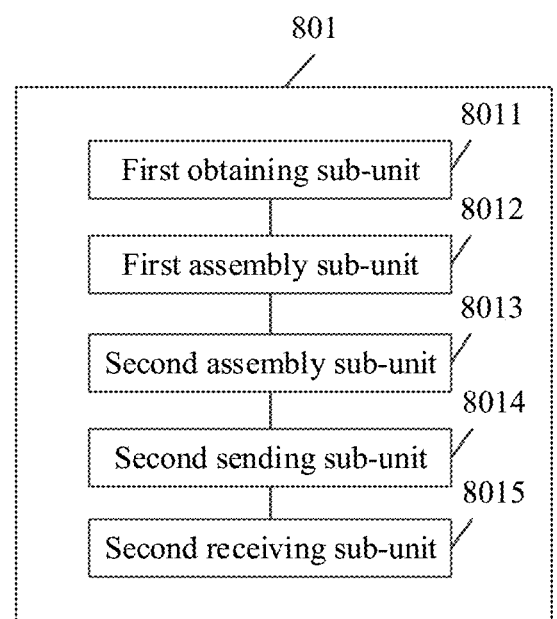
FIG. 9 is a local schematic structural diagram of a terminal device according to an embodiment of the present disclosure.
Figure 10:
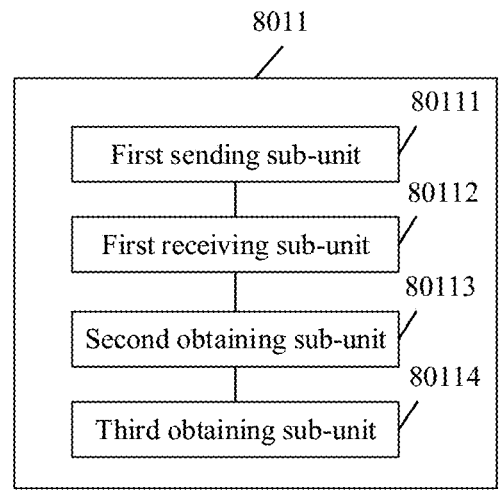
FIG. 10 is a local schematic structural diagram of another terminal device according to an embodiment of the present disclosure.

FIG. 8 is a schematic structural diagram of a terminal device according to an embodiment of the present disclosure. As shown in FIG. 8, the terminal device 800 includes an obtaining unit 801 configured to obtain a primary sub-region bitstream corresponding to a target sub-picture of a panoramic picture, where the primary sub-region bitstream includes N secondary sub-region bitstreams, and N is a positive integer, a parsing unit 802 configured to parse the primary sub-region bitstream to obtain a reconstructed picture, where the reconstructed picture includes N sub-regions, and the N sub-regions one-to-one correspond to the N secondary sub-region bitstreams, a filtering unit 803 configured to perform cross-sub-region-boundary out-loop filtering on the reconstructed picture when an out-loop filtering identifier instructs to perform cross-sub-region-boundary out-loop filtering on the reconstructed picture, to obtain a filtered reconstructed picture, and an adjustment unit 804 configured to adjust a location of at least one of the N sub-regions in the filtered reconstructed picture to obtain the target sub-picture.

Optionally, the obtaining unit 801 includes a first obtaining sub-unit 8011 configured to obtain the N secondary sub-region bitstreams, and a first assembly sub-unit 8012 configured to assemble the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a number of a sub-region corresponding to the secondary sub-region bitstream i and a number of a sub-region bitstream adjacent to the sub-region corresponding to the secondary sub-region bitstream i, each secondary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

Optionally, the obtaining unit 801 includes the first obtaining sub-unit 8011 configured to obtain the N secondary sub-region bitstreams, and a second assembly sub-unit 8013 configured to assemble the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes the sub-region information, the sub-region information is used to indicate information about coordinates, in the panoramic picture, of each of the N sub-regions, and a PPS, an SPS, a VPS, or first SEI of the primary sub-region bitstream includes the out-loop filtering identifier.

Optionally, the first SEI includes the sub-region information.

Optionally, the media presentation description MPD file includes the sub-region information and the out-loop filtering identifier, and the obtaining unit 801 is further configured to obtain the MPD file, and the filtering unit 803 is further configured to obtain the sub-region information from the MPD file, and perform cross-sub-region-boundary out-loop filtering on the reconstructed picture based on the sub-region information.

Optionally, the out-loop filtering identifier, the sub-region information, and a track of the primary sub-region bitstream are encapsulated in a same box.

Optionally, the first obtaining sub-unit 8011 includes a first sending sub-unit 80111 configured to send a bitstream obtaining request to a server, where the bitstream obtaining request includes the information about a visual angle of a user, and a first receiving sub-unit 80112 configured to receive a response message sent by the server to respond to the bitstream obtaining request, where the response message includes the N secondary sub-region bitstreams, and the N secondary sub-region bitstreams correspond to the information about a visual angle of a user.

Optionally, the first obtaining unit 8011 includes a second obtaining sub-unit 80113 configured to obtain, from a server, a secondary sub-region bitstream corresponding to the panoramic picture, and a third obtaining sub-unit 80114 configured to obtain, from the secondary sub-region bitstream corresponding to the panoramic picture, N secondary sub-region bitstreams corresponding to the information about a visual angle of a user.

Optionally, the obtaining unit 801 includes a second sending sub-unit 8014 configured to send a bitstream obtaining request to a server, where the bitstream obtaining request includes information about a visual angle of a user, and a second receiving sub-unit 8015 configured to receive a response message sent by the server to respond to the bitstream obtaining request, where the response message includes the primary sub-region bitstream, and the N secondary sub-region bitstreams included in the primary sub-region bitstream correspond to the information about a visual angle of a user.

Optionally, the filtering unit 803 is configured to determine, based on the sub-region information, a sub-region adjacent to any sub-region j of the N sub-regions, determine a target sub-region based on the sub-region adjacent to the sub-region j, where the target sub-region is an overlapping sub-region of the sub-region adjacent to the sub-region j and the N sub-regions, and perform smoothing filtering on a boundary of the sub-region j and a boundary of the target sub-region.

Optionally, the filtering unit 803 is configured to determine, based on the sub-region information, a sub-region adjacent to any sub-region j of the N sub-regions, obtain a target sub-region from the sub-region adjacent to the sub-region j, where the target sub-region is an overlapping sub-region of the sub-region adjacent to the sub-region j and the N sub-regions, and perform smoothing filtering on a boundary of the sub-region j and a boundary of the target sub-region.

It should be noted that when performing entropy decoding, intra prediction, and motion compensation processing on the primary sub-region bitstream to obtain the reconstructed picture, the parsing unit 802 further outputs quantization information. That the filtering unit 803 performs smoothing filtering on a boundary of the sub-region j based on a boundary of the target sub-region includes the filtering unit 803 determines, based on the quantization information and a pixel gradient of the boundary of the sub-region j adjacent to the target sub-region, whether to perform smoothing filtering on the boundary and determines a corresponding filtering strength.

It should be noted that the foregoing units (the obtaining unit 801, the parsing unit 802, the filtering unit 803, and the adjustment unit 804) are configured to perform the related steps of the foregoing method.

In this embodiment, the terminal device 800 is presented in a form of a unit. The "unit" herein may be an application-specific integrated circuit (ASIC), a processor and a memory that execute one or more software or firmware programs, an integrated logic circuit, and/or another device that can provide the foregoing functions. In addition, the obtaining unit 801, the parsing unit 802, the filtering unit 803, and the adjustment unit 804 may be implemented using a processor 1201 of a terminal device shown in FIG. 12.

Figure 11:
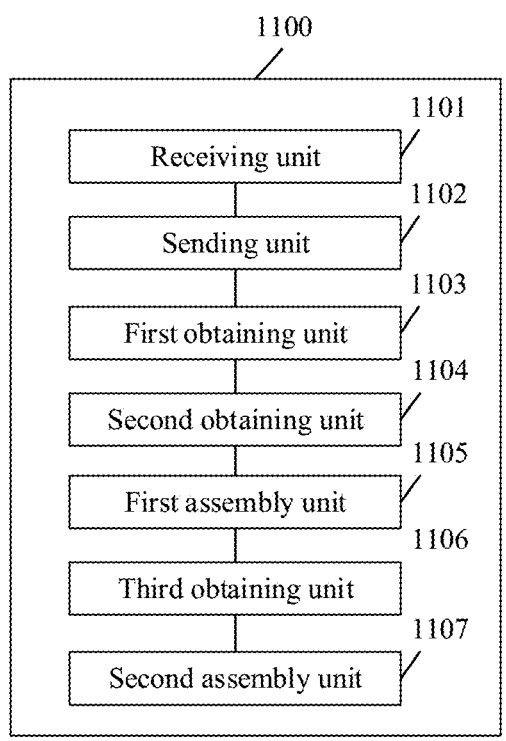
FIG. 11 is a schematic structural diagram of a server according to an embodiment of the present disclosure.

FIG. 11 is a schematic structural diagram of a terminal device according to an embodiment of the present disclosure. As shown in FIG. 11, the terminal device 1100 includes a receiving unit 1101 configured to receive a bitstream obtaining request sent by a terminal device, where the bitstream obtaining request includes information about a visual angle of a user, and a sending unit 1102 configured to send a response message to the terminal device, where the response message is used to respond to the bitstream obtaining request, the response message includes N secondary sub-region bitstreams or a primary sub-region bitstream, and the N secondary sub-region bitstreams are used to be assembled into the primary sub-region bitstream.

Optionally, the response message includes the N secondary sub-region bitstreams, and the server 1100 further includes a first obtaining unit 1103 configured to after the receiving unit receives the bitstream obtaining request sent by the terminal device, obtain, from a secondary sub-region bitstream corresponding to a panoramic picture, N secondary sub-region bitstreams corresponding to the information about a visual angle of a user.

Optionally, the response message includes the primary sub-region bitstream, the primary sub-region bitstream includes N secondary sub-region bitstreams, and the server 1100 further includes a second obtaining unit 1104 configured to, after the receiving unit 1101 receives the bitstream obtaining request sent by the terminal device, obtain, from a secondary sub-region bitstream corresponding to a panoramic picture, N secondary sub-region bitstreams corresponding to the information about a visual angle of a user, and a first assembly unit 1105 configured to assemble the N secondary sub-region bitstreams into the primary sub-region bitstream, where each of the N secondary sub-region bitstreams includes second SEI, second SEI of any secondary sub-region bitstream i of the N secondary sub-region bitstreams is used to identify a sub-region corresponding to the secondary sub-region bitstream i and a sub-region adjacent to the sub-region corresponding to the secondary sub-region bitstream i, the primary sub-region bitstream includes sub-region information, the sub-region information is used to identify each of the N sub-regions and a sub-region adjacent to the sub-region, and a PPS, a SPS, a VPS, or first SEI of the primary sub-region bitstream includes the out-loop filtering identifier.

Optionally, the response message includes the primary sub-region bitstream, the primary sub-region bitstream includes N secondary sub-region bitstreams, and the server 1100 further includes a third obtaining unit 1106 configured to, after the receiving unit 1101 receives the bitstream obtaining request sent by the terminal device, obtain, from M secondary sub-region bitstreams corresponding to a panoramic picture, N secondary sub-region bitstreams corresponding to the information about a visual angle of a user, and a second assembly unit 1107 configured to assemble the N secondary sub-region bitstreams into the primary sub-region bitstream, where each of the N secondary sub-region bitstreams includes information about coordinates, in the panoramic picture, of a sub-region corresponding to the secondary sub-region bitstream, the primary sub-region bitstream includes sub-region information, the sub-region information is used to identify information about coordinates, in the panoramic picture, of each of the N sub-regions, and a PPS, an SPS, a VPS, or first SEI of the primary sub-region bitstream includes the out-loop filtering identifier.

Optionally, the first SEI includes the sub-region information.

Optionally, the out-loop filtering identifier, the sub-region information, and a track of the primary sub-region bitstream are encapsulated in a same box, or the out-loop filtering identifier and the sub-region information are encapsulated in a media presentation description MPD file.

It should be noted that the foregoing units (the receiving unit 1101, the sending unit 1102, the first obtaining unit 1103, the second obtaining unit 1104, the first assembling unit 1105, the third obtaining unit 1106, and the second assembling unit 1107) are configured to perform the related steps of the foregoing method.

In this embodiment, the terminal device 800 is presented in a form of a unit. The "unit" herein may be an ASIC, a processor and a memory that execute one or more software or firmware programs, an integrated logic circuit, and/or another device that can provide the foregoing functions. In addition, the receiving unit 1101, the sending unit 1102, the first obtaining unit 1103, the second obtaining unit 1104, the first assembling unit 1105, the third obtaining unit 1106, and the second assembling unit 1107 may be implemented using a processor 1301 of a server shown in FIG. 13.

Figure 12:
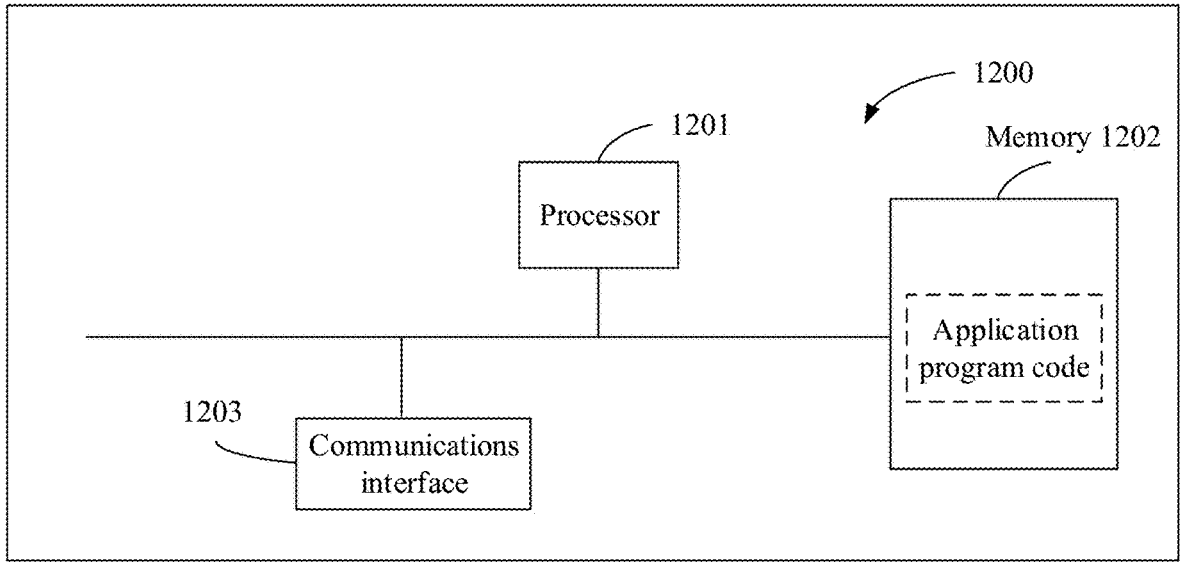
FIG. 12 is a schematic structural diagram of another terminal device according to an embodiment of the present disclosure.

As shown in FIG. 12, a terminal device 1200 may be implemented using a structure in FIG. 12. The terminal device 1200 includes at least one processor 1201, at least one memory 1202, and at least one communications interface 1203. The processor 1201, the memory 1202, and the communications interface 1203 are connected and communicate with each other using a communications bus.

The processor 1201 may be a general-purpose central processing unit (CPU), a microprocessor, an ASIC, or one or more integrated circuits configured to control program execution of the foregoing solutions.

The communications interface 1203 is configured to communicate with another device or a communications network such as the Ethernet, a radio access network (RAN), or a wireless local area network (WLAN).

The memory 1202 may be a read-only memory (ROM) or another type of static storage device that can store static information and a static instruction, or a random access memory (RAM), or another type of dynamic storage device that can store information and an instruction, or may be an electrically erasable programmable read-only memory (EEPROM), a compact disc read-only memory (CD-ROM) or another optical disc storage, an optical disc storage (including a compact disc, a laser disc, an optical disc, a digital versatile disc, a BLU-RAY disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and may be connected to the processor using the bus. The memory may alternatively be integrated into the processor.

The memory 1202 is configured to store application program code for executing the foregoing solutions, and the processor 1201 controls the execution. The processor 1201 is configured to execute the application program code stored in the memory 1202.

The code stored in the memory 1202 may perform the foregoing video picture encoding and decoding method performed by the terminal device provided above, for example, obtaining a primary sub-region bitstream corresponding to a target sub-picture of a panoramic picture, where the primary sub-region bitstream includes N secondary sub-region bitstreams, and N is a positive integer, parsing the primary sub-region bitstream to obtain a reconstructed picture, where the reconstructed picture includes N sub-regions, and the N sub-regions one-to-one correspond to the N secondary sub-region bitstreams, performing cross-sub-region-boundary out-loop filtering on the reconstructed picture when an out-loop filtering identifier instructs to perform cross-sub-region-boundary out-loop filtering on the reconstructed picture, to obtain a filtered reconstructed picture, and adjusting a location of at least one of the N sub-regions in the filtered reconstructed picture to obtain the target sub-picture.

The embodiments of the present disclosure further provide a computer storage medium. The computer storage medium may store a program. When the program is executed, some or all of the steps of any one video picture encoding and decoding method recorded in the foregoing method embodiments are performed.

Figure 13:
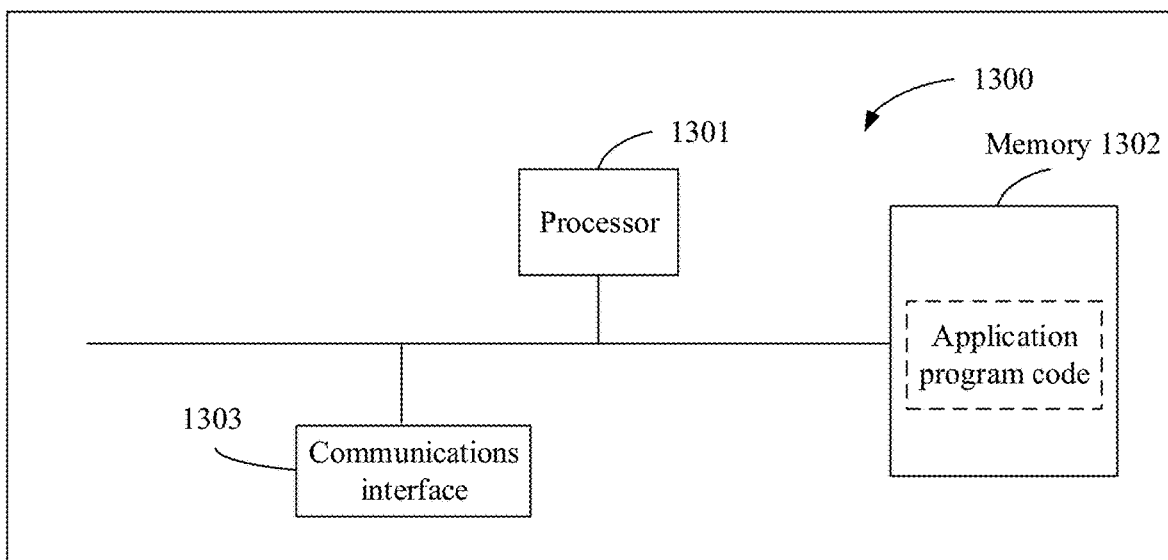
FIG. 13 is a schematic structural diagram of another server according to an embodiment of the present disclosure.

As shown in FIG. 13, a server 1300 may be implemented using a structure in FIG. 13. The server 1300 includes at least one processor 1301, at least one memory 1302, and at least one communications interface 1303. The processor 1301, the memory 1302, and the communications interface 1303 are connected and communicate with each other using a communications bus.

The processor 1301 may be a general-purpose CPU, a microprocessor, an ASIC, or one or more integrated circuits configured to control program execution of the foregoing solutions.

The communications interface 1303 is configured to communicate with another device or a communications network such as the Ethernet, a RAN, or a WLAN.

The memory 1302 may be a ROM, another type of static storage device that can store static information and a static instruction, a RAM, or another type of dynamic storage device that can store information and an instruction, or may be an EEPROM, a CD-ROM or another optical disc storage, an optical disc storage (including a compact disc, a laser disc, an optical disc, a digital versatile disc, a BLU-RAY disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and may be connected to the processor using the bus. The memory may alternatively be integrated into the processor.

The memory 1302 is configured to store application program code for executing the foregoing solutions, and the processor 1301 controls the execution. The processor 1301 is configured to execute the application program code stored in the memory 1302.

The code stored in the memory 1302 may execute the foregoing video picture encoding and decoding method performed by the server provided above, for example, receiving a bitstream obtaining request sent by a terminal device, where the bitstream obtaining request includes information about a visual angle of a user, and sending a response message to the terminal device, where the response message is used to respond to the bitstream obtaining request, the response message includes N secondary sub-region bitstreams or a primary sub-region bitstream, and the N secondary sub-region bitstreams are used to be assembled into the primary sub-region bitstream.

The embodiments of the present disclosure further provide a computer storage medium. The computer storage medium may store a program. When the program is executed, some or all of the steps of any one video picture encoding and decoding method recorded in the foregoing method embodiments are performed.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the plurality of embodiments provided in this application, it should be understood that the disclosed apparatuses may be implemented in other manners. For example, the described apparatus embodiments are merely examples. For example, the unit division is merely logical function division and may be other division in an embodiment. For example, a plurality of units or components may be combined or integrated into another system, or some features may be ignored or may be not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage. Based on such an understanding, the technical solutions of the present disclosure essentially, or the part contributing to other approaches, or all or some of the technical solutions may be implemented in the form of a software product. The software product is stored in a storage and includes a plurality of instructions for instructing a computer device (which may be a personal computer, a server, a network device, or the like) to perform all or some of the steps of the methods described in the embodiments of the present disclosure. The foregoing storage medium includes any medium that can store program code, such as a Universal Serial Bus (USB) flash drive, a ROM, a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer readable storage medium. The storage medium may include a flash memory, a ROM, a RAM, a magnetic disk, and an optical disc.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of this specification shall not be construed as a limit to the present disclosure.

What is claimed is:

1. A video picture encoding and decoding method, comprising:
    obtaining a primary sub-region bitstream corresponding to a target sub-picture of a panoramic picture by:
        obtaining a plurality of secondary sub-region bitstreams; and
        assembling the secondary sub-region bitstreams into the primary sub-region bitstream, wherein each of the secondary sub-region bitstreams comprises supplementary enhancement information (SEI) identifying a first sub-region and a second sub-region that is adjacent to the first sub-region, and wherein the primary sub-region bitstream comprises sub-region information identifying each of a plurality of sub-regions corresponding to the secondary sub-region bitstreams and a third sub-region that is adjacent to each of the sub-regions;
    parsing the primary sub-region bitstream to obtain a reconstructed picture comprising the plurality of sub-regions corresponding to the secondary sub-region bitstreams;
    obtaining a media presentation description (MPD) file comprising the sub-region information and an out-loop filtering identifier;
    performing cross-sub-region-boundary out-loop filtering on the reconstructed picture to obtain a filtered reconstructed picture based on the out-loop filtering identifier and the sub-region information; and
    adjusting a location of at least one of the sub-regions in the filtered reconstructed picture to obtain the target sub-picture.

2. The video picture encoding and decoding method of claim 1, wherein a picture parameter set (PPS), a sequence parameter set (SPS), a video parameter set (VPS), or SEI of the primary sub-region bitstream comprises the out-loop filtering identifier.

3. The video picture encoding and decoding method of claim 1, wherein each of the secondary sub-region bitstreams comprises information about coordinates of a fourth sub-region corresponding to the secondary sub-region bitstreams in the panoramic picture, wherein the primary sub-region bitstream comprises the sub-region information further indicating information about the coordinates of each of the sub-regions in the panoramic picture, and wherein a picture parameter set (PPS), a sequence parameter set (SPS), a video parameter set (VPS), or supplementary enhancement information (SEI) of the primary sub-region bitstream comprises the out-loop filtering identifier.

4. The video picture encoding and decoding method of claim 2, wherein the SEI of the primary sub-region bitstream comprises the sub-region information.

5. The video picture encoding and decoding method of claim 3, wherein the out-loop filtering identifier, the sub-region information, and a track of the primary sub-region bitstream are in a same box.

6. The video picture encoding and decoding method of claim 1, further comprising:
sending a bitstream obtaining request to a server, wherein the bitstream obtaining request comprises information about a visual angle of a user; and
receiving a response message from the server in response to the bitstream obtaining request, wherein the response message comprises the secondary sub-region bitstreams corresponding to the information about the visual angle of the user.

7. The video picture encoding and decoding method of claim 1, further comprising:
obtaining a secondary sub-region bitstream corresponding to the panoramic picture from a server; and
obtaining, from the secondary sub-region bitstream, the secondary sub-region bitstreams corresponding to information about a visual angle of a user.

8. The video picture encoding and decoding method of claim 1, further comprising:
sending a bitstream obtaining request to a server, wherein the bitstream obtaining request comprises information about a visual angle of a user; and
receiving a response message from the server in response to the bitstream obtaining request, wherein the response message comprises the primary sub-region bitstream, and wherein the secondary sub-region bitstreams correspond to the information about the visual angle of the user.

9. The video picture encoding and decoding method of claim 1, wherein performing the cross-sub-region-boundary out-loop filtering comprises:
determining, based on the sub-region information, a fourth sub-region adjacent to a fifth sub-region of the sub-regions;
determining a target sub-region based on the fourth sub-region, where the target sub-region is an overlapping sub-region of the fourth sub-region and the sub-regions; and
performing smoothing filtering on a boundary of the fourth sub-region and a boundary of the target sub-region.

10. A video picture encoding and decoding method, comprising:
receiving, from a terminal device, a bitstream obtaining request comprising information about a visual angle of a user;
sending, to the terminal device in response to the bitstream obtaining request, a response message comprising a plurality of secondary sub-region bitstreams or a primary sub-region bitstream; and
obtaining, from a secondary sub-region bitstream corresponding to a panoramic picture, the secondary sub-region bitstreams corresponding to the information about the visual angle, wherein the secondary sub-region bitstreams are assembled into the primary sub-region bitstream, wherein each of the secondary sub-region bitstreams comprises supplementary enhancement information (SEI) identifying a first sub-region and a second sub-region that is adjacent to the first sub-region, wherein the primary sub-region bitstream comprises sub-region information identifying each of the sub-regions and a third sub-region that is adjacent to each of the sub-regions, wherein a picture parameter set (PPS), a sequence parameter set (SPS), a video parameter set (VPS), or SEI of the primary sub-region bitstream comprises an out-loop filtering identifier, and wherein the sub-region information and the out-loop filtering identifier are further comprised in a media presentation description (MPD) file.

11. A terminal device, comprising:
a processor; and
a memory coupled to the processor and storing instructions that, when executed by the processor, cause the terminal device to be configured to:
obtain a primary sub-region bitstream corresponding to a target sub-picture of a panoramic picture, wherein to obtain the primary sub-region bitstream, the instructions further cause the processor to be configured to:
obtain a plurality of secondary sub-region bitstreams; and
assemble the secondary sub-region bitstreams into the primary sub-region bitstream, wherein each of the secondary sub-region bitstreams comprises supplementary enhancement information (SEI) identifying a first sub-region and a second sub-region that is adjacent to the first sub-region, and wherein the primary sub-region bitstream comprises sub-region information identifying each of a plurality of sub-regions corresponding to the secondary sub-region bitstreams and a third sub-region that is adjacent to each of the sub-regions;
parse the primary sub-region bitstream to obtain a reconstructed picture comprising a plurality of sub-regions corresponding to the secondary sub-region bitstreams, wherein the sub-region information identifies each sub-region in the sub-regions and an adjacent sub-region of each sub-region;
obtain a media presentation description (MPD) file comprising the sub-region information and an out-loop filtering identifier;
perform cross-sub-region-boundary out-loop filtering on the reconstructed picture to obtain a filtered reconstructed picture based on the out-loop filtering identifier and the sub-region information; and
adjust a location of at least one of the sub-regions in the filtered reconstructed picture to obtain the target sub-picture.

12. The terminal device of claim 11, wherein a picture parameter set (PPS), a sequence parameter set (SPS), a video parameter set (VPS), or SEI of the primary sub-region bitstream comprises the out-loop filtering identifier.

13. The terminal device of claim 11, wherein each of the secondary sub-region bitstreams comprises information about coordinates of a fourth sub-region corresponding to the secondary sub-region bitstreams in the panoramic picture, wherein the primary sub-region bitstream comprises the sub-region information further indicating information about the coordinates of each of the sub-regions in the panoramic picture, and wherein a picture parameter set (PPS), a sequence parameter set (SPS), a video parameter set (VPS), or supplementary enhancement information (SEI) of the primary sub-region bitstream comprises the out-loop filtering identifier.

14. The terminal device of claim 12, wherein the SEI of the primary sub-region bitstream comprises the sub-region information.

15. The terminal device of claim 13, wherein the out-loop filtering identifier, the sub-region information, and a track of the primary sub-region bitstream are in a same box.

16. The terminal device of claim 13, wherein the instructions further cause the processor to be configured to:
- send a bitstream obtaining request to a server, wherein the bitstream obtaining request comprises information about a visual angle of a user; and
- receive a response message from the server in response to the bitstream obtaining request, wherein the response message comprises the secondary sub-region bitstreams corresponding to the information about the visual angle of the user.

17. The terminal device of claim 11, wherein the instructions further cause the processor to be configured to:
- obtain a secondary sub-region bitstream corresponding to the panoramic picture from a server; and
- obtain the secondary sub-region bitstreams corresponding to information about a visual angle of a user from the secondary sub-region bitstream.

18. The terminal device of claim 11, wherein the instructions further cause the processor to be configured to:
- send a bitstream obtaining request to a server, wherein the bitstream obtaining request comprises information about a visual angle of a user; and
- receive a response message from the server in response to the bitstream obtaining request, wherein the response message comprises the primary sub-region bitstream, and wherein the secondary sub-region bitstreams correspond to the information about the visual angle of the user.

19. The terminal device of claim 11, wherein the instructions further cause the processor to be configured to:
- determine, based on the sub-region information, a fourth sub-region adjacent to a fifth sub-region of the sub-regions;
- determine a target sub-region based on the fourth sub-region, wherein the target sub-region is an overlapping sub-region of the fourth sub-region and the sub-regions; and
- perform smoothing filtering on a boundary of the fourth sub-region and a boundary of the target sub-region.

20. A server, comprising:
- a receiver configured to receive a bitstream obtaining request from a terminal device, wherein the bitstream obtaining request comprises information about a visual angle of a user;
- a transmitter coupled to the receiver and configured to send, in response to the bitstream obtaining request, a response message to the terminal device, wherein the response message comprises a plurality of secondary sub-region bitstreams or a primary sub-region bitstream; and
- a processor coupled to the transmitter and configured to obtain, from a secondary sub-region bitstream corresponding to a panoramic picture, the secondary sub-region bitstreams corresponding to the information about the visual angle,
- wherein the secondary sub-region bitstreams are assembled into the primary sub-region bitstream, wherein each of the secondary sub-region bitstreams comprises supplementary enhancement information (SEI) identifying a first sub-region and a second sub-region that is adjacent to the first sub-region, wherein the primary sub-region bitstream comprises sub-region information identifying each of the sub-regions and a third sub-region that is adjacent to each of the sub-regions, and wherein a picture parameter set (PPS), a sequence parameter set (SPS), a video parameter set (VPS), or SEI of the primary sub-region bitstream comprises an out-loop filtering identifier, and wherein the sub-region information and the out-loop filtering identifier are further comprised in a media presentation description (MPD) file.

* * * * *